(12) United States Patent
You et al.

(10) Patent No.: US 9,860,890 B2
(45) Date of Patent: Jan. 2, 2018

(54) METHOD AND TERMINAL FOR RECEIVING BUNDLE OF EPDCCHS

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Inkwon Seo, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 15/034,628

(22) PCT Filed: Dec. 17, 2014

(86) PCT No.: PCT/KR2014/012494
§ 371 (c)(1),
(2) Date: May 5, 2016

(87) PCT Pub. No.: WO2015/093851
PCT Pub. Date: Jun. 25, 2015

(65) Prior Publication Data
US 2016/0278054 A1    Sep. 22, 2016

Related U.S. Application Data

(60) Provisional application No. 61/917,934, filed on Dec. 18, 2013.

(51) Int. Cl.
*H04W 72/04*     (2009.01)
*H04B 7/26*      (2006.01)
(Continued)

(52) U.S. Cl.
CPC ........ *H04W 72/042* (2013.01); *H04B 7/2671* (2013.01); *H04L 5/0007* (2013.01);
(Continued)

(58) Field of Classification Search
None
See application file for complete search history.

(56) References Cited

U.S. PATENT DOCUMENTS 9,084,252 B2 *  7/2015  Chen ..................... H04L 1/0038
9,107,162 B2 *  8/2015  Zhu .................... H04W 52/0258
(Continued)

FOREIGN PATENT DOCUMENTS

WO    WO 2013/019088 A2    2/2013
WO    WO 2013/115571 A1    2/2013

OTHER PUBLICATIONS

LG Electronics, "PDCCH transmission for MTC coverage enhancement", R1-135461, 3GPP TSG RAN WG1 Meeting #75, San Francisco, USA, Nov. 11-15, 2013, pp. 1-3.
(Continued)

*Primary Examiner* — Hong Cho
(74) *Attorney, Agent, or Firm* — Birch, Stewart, Kolasch & Birch, LLP

(57) ABSTRACT

One disclosure of the present specification provides a method for receiving EPDCCH by an MTC device. The method comprises: a step for determining a first search space and a second search space for receiving EPDCCH on a first subframe and a second subframe, respectively, from among N-number of subframes, if a bundle of EPDCCHs in which the same EPDCCH is repeated on the N-number of subframes should be received, wherein each of the first and second search spaces is determined on the basis of the number of EPDCCH candidates, and determined by any one of a first case, a second case and a third case classified on the
(Continued)

basis of a DCI format and whether a CP being used is a normal CP or an extended CP; and a step for decoding the EPDCCH in the second search space if the cases for determining the first search space and the second search space are the same.

13 Claims, 25 Drawing Sheets

(51) Int. Cl.
  *H04L 5/00* (2006.01)
  *H04L 27/26* (2006.01)
  *H04W 4/00* (2009.01)
  *H04W 92/18* (2009.01)
(52) U.S. Cl.
  CPC ........ *H04L 5/0053* (2013.01); *H04L 27/2602* (2013.01); *H04L 27/2607* (2013.01); *H04W 4/005* (2013.01); *H04W 72/0446* (2013.01); *H04W 92/18* (2013.01)

(56) References Cited

U.S. PATENT DOCUMENTS

| | | | |
|---|---|---|---|
| 9,553,701 B2* | 1/2017 | Sadeghi | .............. H04L 5/005 |
| 9,692,569 B2* | 6/2017 | Frenne | .............. H04L 5/0048 |
| 2013/0194931 A1* | 8/2013 | Lee | .............. H04L 5/0053 |
| | | | 370/241 |
| 2014/0071918 A1* | 3/2014 | Park | .............. H04W 72/14 |
| | | | 370/329 |
| 2014/0314048 A1 | 10/2014 | Yi et al. | |

OTHER PUBLICATIONS

LG Electronics, "PDSCH/PUSCH transmission for MTC coverage enhancement", R1-135462, 3GPP TSG RAN WG1 Meeting #75, San Francisco, USA, Nov. 11-15, 2013, pp. 1-4.

Motorola Mobility, "MTC Coverage improvement for Control Channels", R1-135674, 3GPP TSG RAN WG1 Meeting #75, San Francisco, Nov. 11-15, 2013, pp. 1-2.

* cited by examiner

FIG. 8
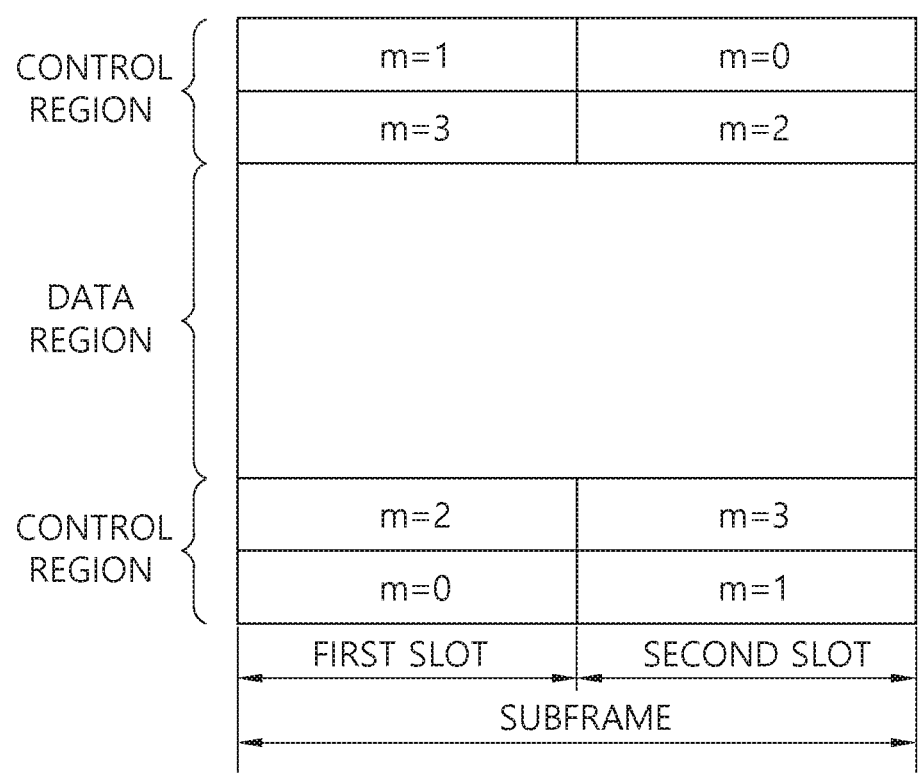
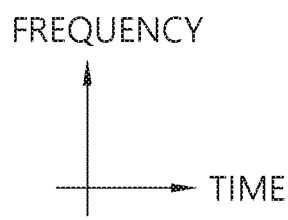

METHOD AND TERMINAL FOR RECEIVING BUNDLE OF EPDCCHS

CROSS REFERENCE TO RELATED APPLICATIONS

This application is the National Phase of PCT/KR2014/012494 filed on Dec. 17, 2014, which claims priority under 35 U.S.C. §119(e) to U.S. Provisional Application No. 61/917,934 filed on Dec. 18, 2013, all of which are hereby expressly incorporated by reference into the present application.

BACKGROUND OF THE INVENTION

Field of the Invention

The present invention relates to wireless communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

In recent years, machine-type communication (MTC), which is communication between devices or between a device and a server via no human interaction, that is, without human intervention, is actively under research. MTC refers to the concept of communication based on an existing wireless communication network performed by a machine device instead of a user equipment (UE) used by a user.

Since MTC has a feature different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Recently, it is considered to extend cell coverage of a BS for an MTC device, and various schemes for extending the cell coverage are under discussion. However, when the cell coverage is extended, if the BS transmits a channel to the MTC device located in the coverage extension region as if transmitting a channel to a normal UE, the MTC device has a difficulty in receiving the channel.

Further, as the MTC device is expected to have low performance in order to supply more MTC devices at a low price, if the BS transmits a PDCCH, an EPDCCH, or a PDSCH to the MTC apparatus located in the coverage extension region as if transmitting a PDCCH, an EPDCCH, or a PDSCH to a normal UE, the MTC device has a difficulty in receiving the PDCCH, an EPDCCH, or the PDSCH.

SUMMARY OF THE INVENTION

An aspect of the present invention is aimed at solving the foregoing problems.

To achieve the foregoing aspect, one embodiment of the present invention provides a method of receiving an enhanced physical downlink control channel (EPDCCH) by a user equipment (UE). The method may comprise: determining a first search space for receiving an EPDCCH on a first subframe among N subframes when an EPDCCH bundle in which the same EPDCCH is repeated on the N subframes is to be received; determining a second search space for receiving the EPDCCH on a second subframe among the N subframes, each of the first and second search spaces being determined based on a number of EPDCCH candidates, and the number of EPDCCH candidates being determined according to any one of a first case (case 1), a second case (case 2) and a third case (case 3) classified on the basis of a DCI format and whether a cyclic prefix (CP) being used is a normal CP or an extended CP; and decoding the EPDCCH in the second search space of the second subframe when cases for determining the first search space and the second search space are the same.

The case for the first search space and the case for the second search space may be the first case, which supports aggregation level 32.

The method may further comprise: skipping the decoding of the EPDCCH in the second search space of the second subframe when the case for the first search space and the case for the second search space are different.

The number of EPDCCH candidates may be determined on an aggregation level.

The first case may support aggregation levels of 2, 4, 8, 16, and 32, the second case may support aggregation levels of 2, 4, 8, and 16, the third case may support aggregation levels of 2, 4, 8, and 16, and different numbers of EPDCCH candidates ma be configured by aggregation levels in the second case and the third case.

The decoding of the EPDCCH in the second search space may be performed assuming that an aggregation level for the first search space and an aggregation level for the second search space are the same.

When an aggregation level for the first search space and an aggregation level for the second search space are the aggregation levels for the first case.

The UE assumes that a number of EPDCCH candidates in the second search space is a number of EPDCCH candidates in an aggregation level two times an aggregation level for the second search space.

The UE is a machine-type communication (MTC) device located in a coverage extension region.

To achieve the foregoing aspect, one embodiment of the present invention provides a user equipment (UE) for receiving an enhanced physical downlink control channel (EPDCCH). The UE may comprise: a radio frequency (RF) unit; and a processor to determine a first search space for receiving an EPDCCH on a first subframe among N subframes when an EPDCCH bundle in which the same EPDCCH is repeated on the N subframes is to be received through the RF unit, to decode the first subframe in the first search space, to determine a second search space for receiving the EPDCCH on a second subframe among the N subframes, and to decode the second subframe in the second search space. Here, the first and second search spaces are determined based on a number of EPDCCH candidates. And, the EPDCCH candidates are determined according to any one of a first case (case 1), a second case (case 2) and a third case (case 3). The processor decodes the second subframe when cases for the first search space and the second search space are the same.

Embodiments of the present invention are provided to solve the foregoing problems of the conventional technology. Specifically, embodiments of the present invention may improve reception performance and decoding performance of an MTC device located in a coverage extension region of a BS.

BRIEF DESCRIPTION OF THE DRAWINGS

FIG. 8 illustrates an architecture of an uplink (UL) subframe in 3GPP LTE.

DESCRIPTION OF EXEMPLARY EMBODIMENTS

Figure 1:
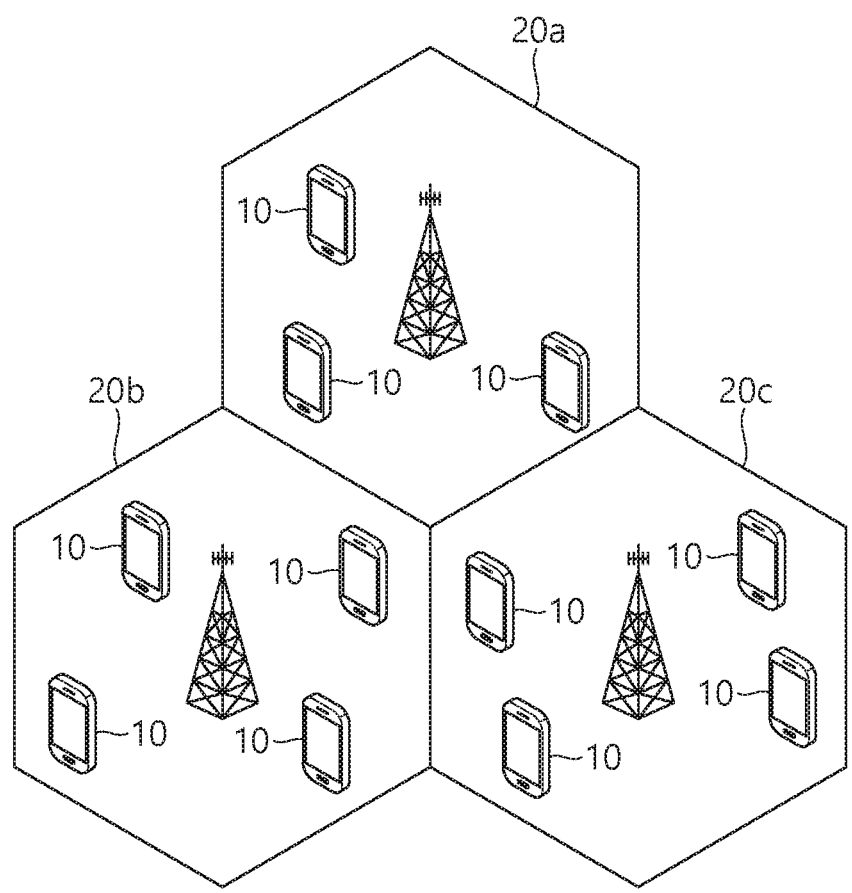
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
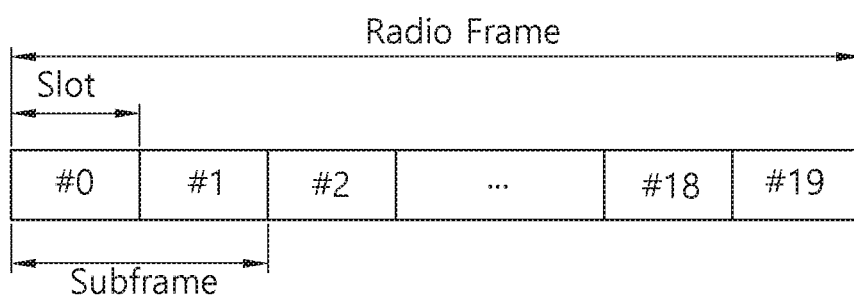
FIG. 2 illustrates an architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
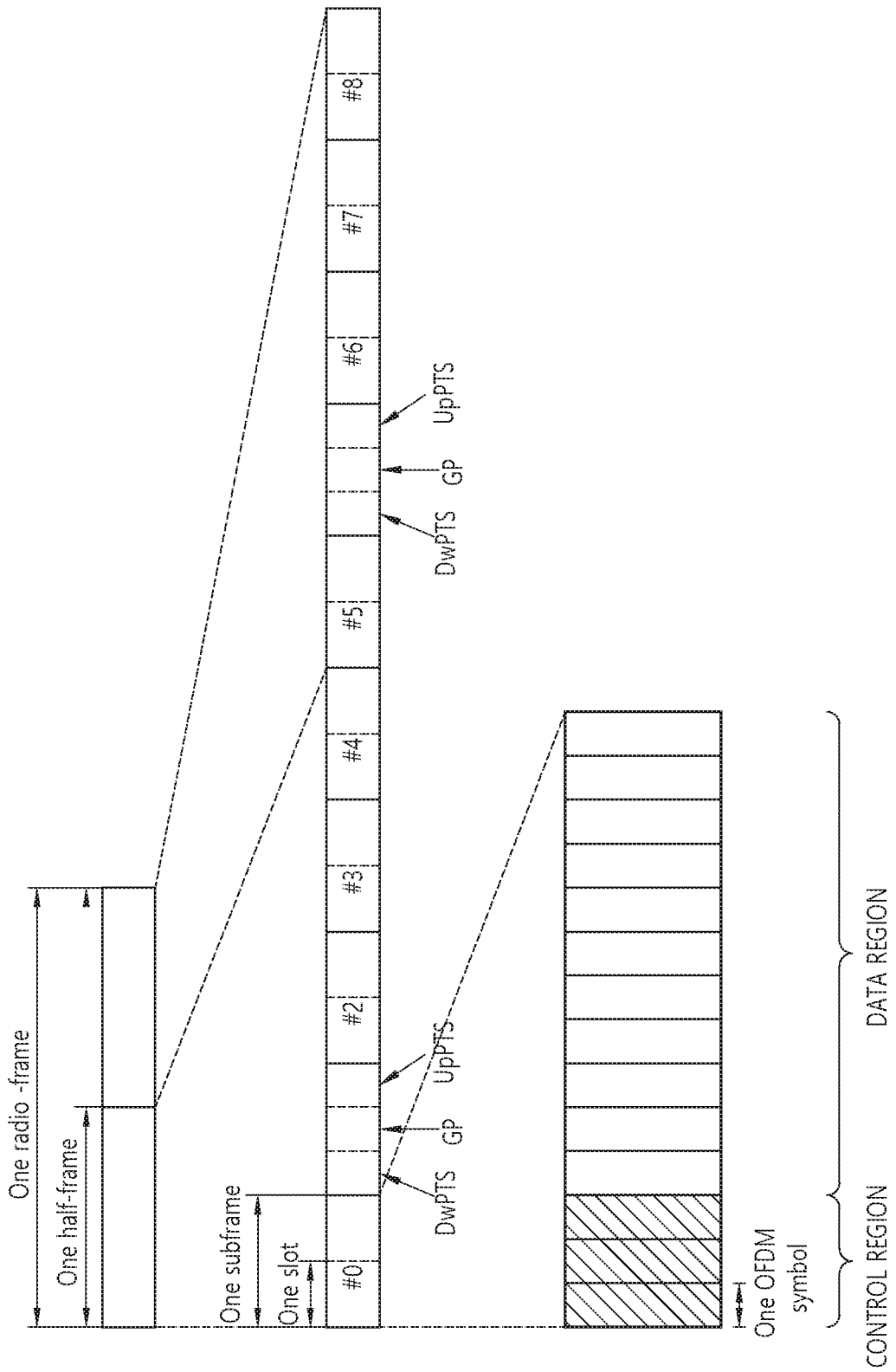
FIG. 3 illustrates an architecture of a downlink radio frame according to time division duplex (TDD) in 3GPP LTE.

FIG. 3 illustrates an architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 4:
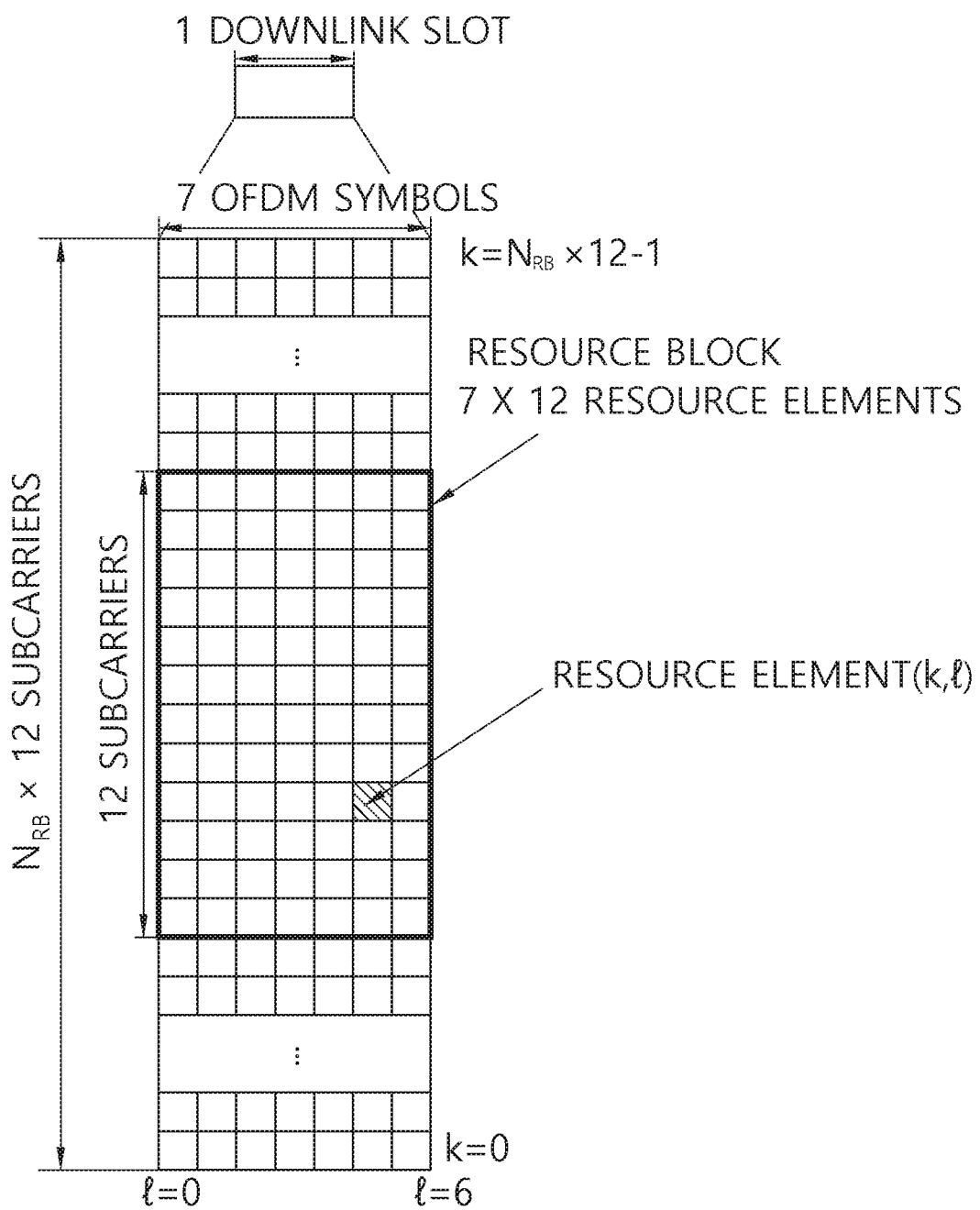
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Figure 5:
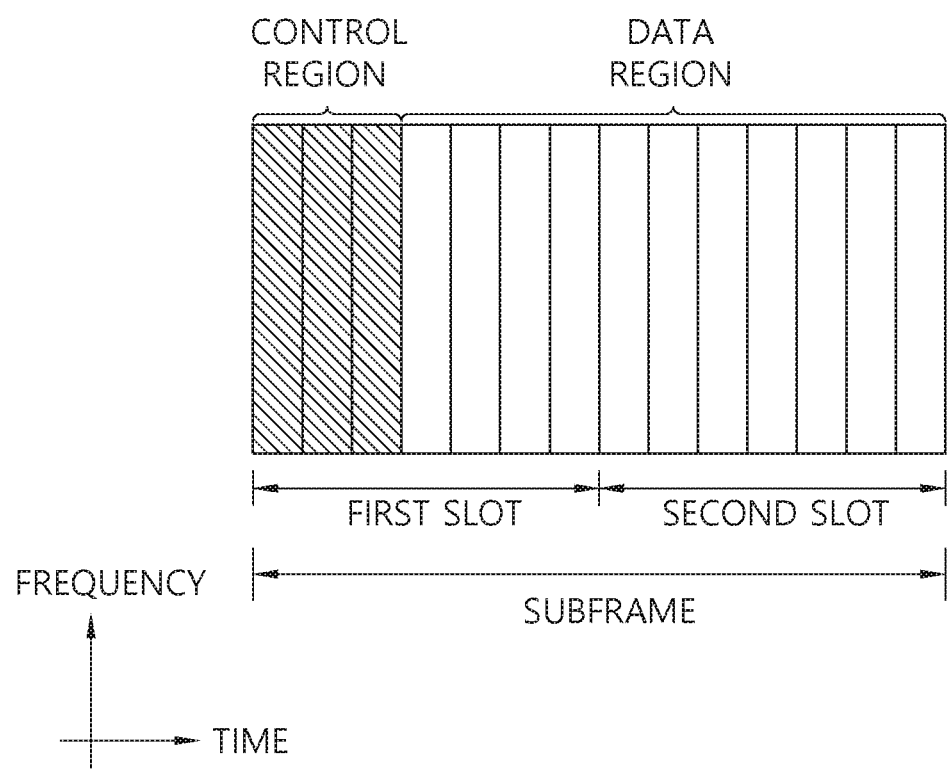
FIG. 5 illustrates an architecture of a downlink subframe.

FIG. 5 illustrates an architecture of a downlink subframe.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
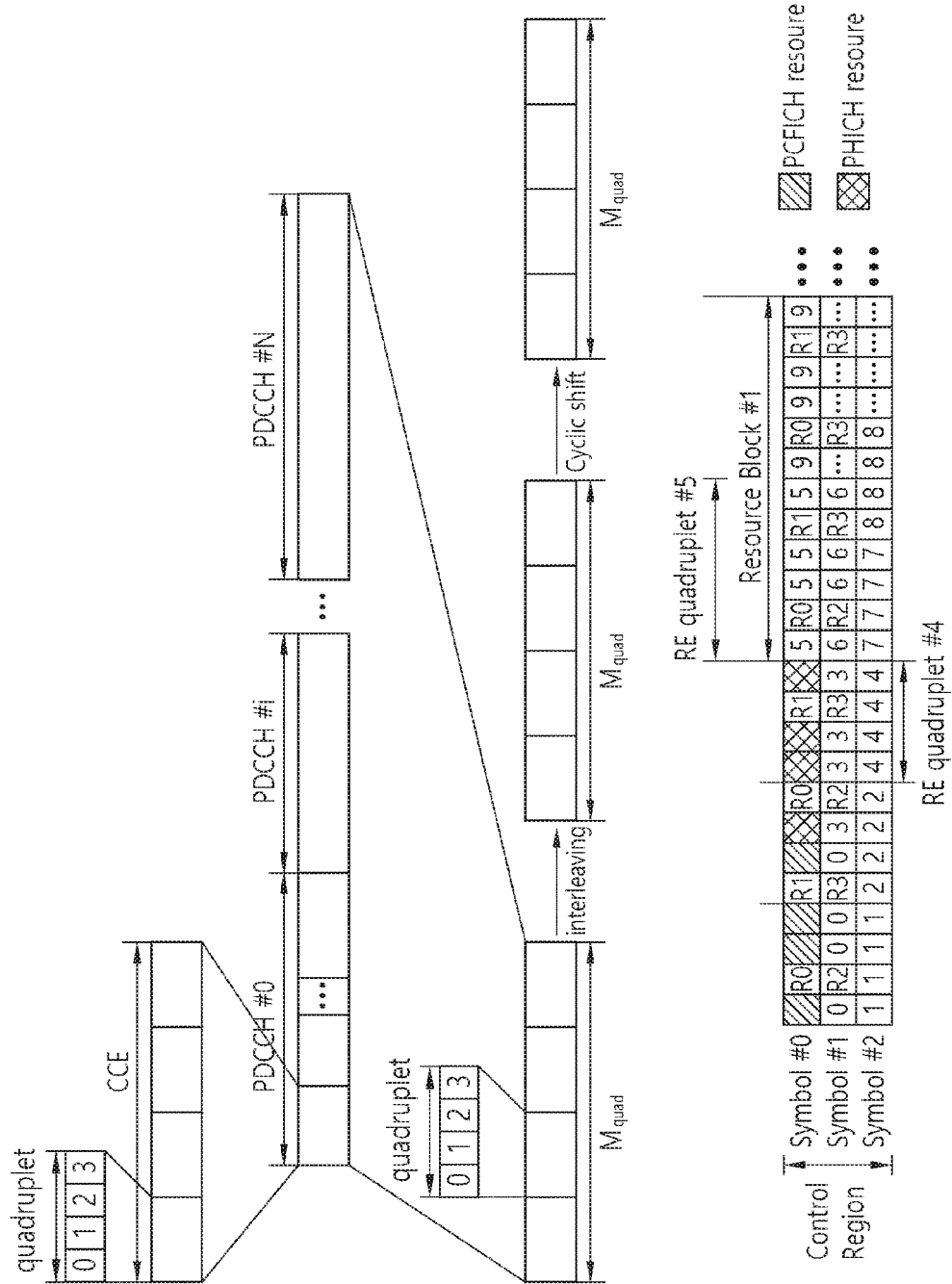
FIG. 6 illustrates an example of resource mapping of a PDCCH.

FIG. 6 illustrates an example of resource mapping of a PDCCH.

R0 denotes a reference signal of a $1^{st}$ antenna, R1 denotes a reference signal of a $2^{nd}$ antenna, R2 denotes a reference signal of a $3^{rd}$ antenna, and R3 denotes a reference signal of a $4^{th}$ antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

A BS determines the number of CCEs used in transmission of the PDCCH according to a channel state. For example, a UE having a good DL channel state may use one CCE in PDCCH transmission. A UE having a poor DL channel state may use 8 CCEs in PDCCH transmission.

One REG (indicated by a quadruplet in the drawing) includes 4 REs. One CCE includes 9 REGs. The number of CCEs used to configure one PDCCH may be selected from {1, 2, 4, 8}. Each element of {1, 2, 4, 8} is referred to as a CCE aggregation level.

A control channel consisting of one or more CCEs performs interleaving in unit of REG, and is mapped to a physical resource after performing cyclic shift based on a cell identifier (ID).

Figure 7:
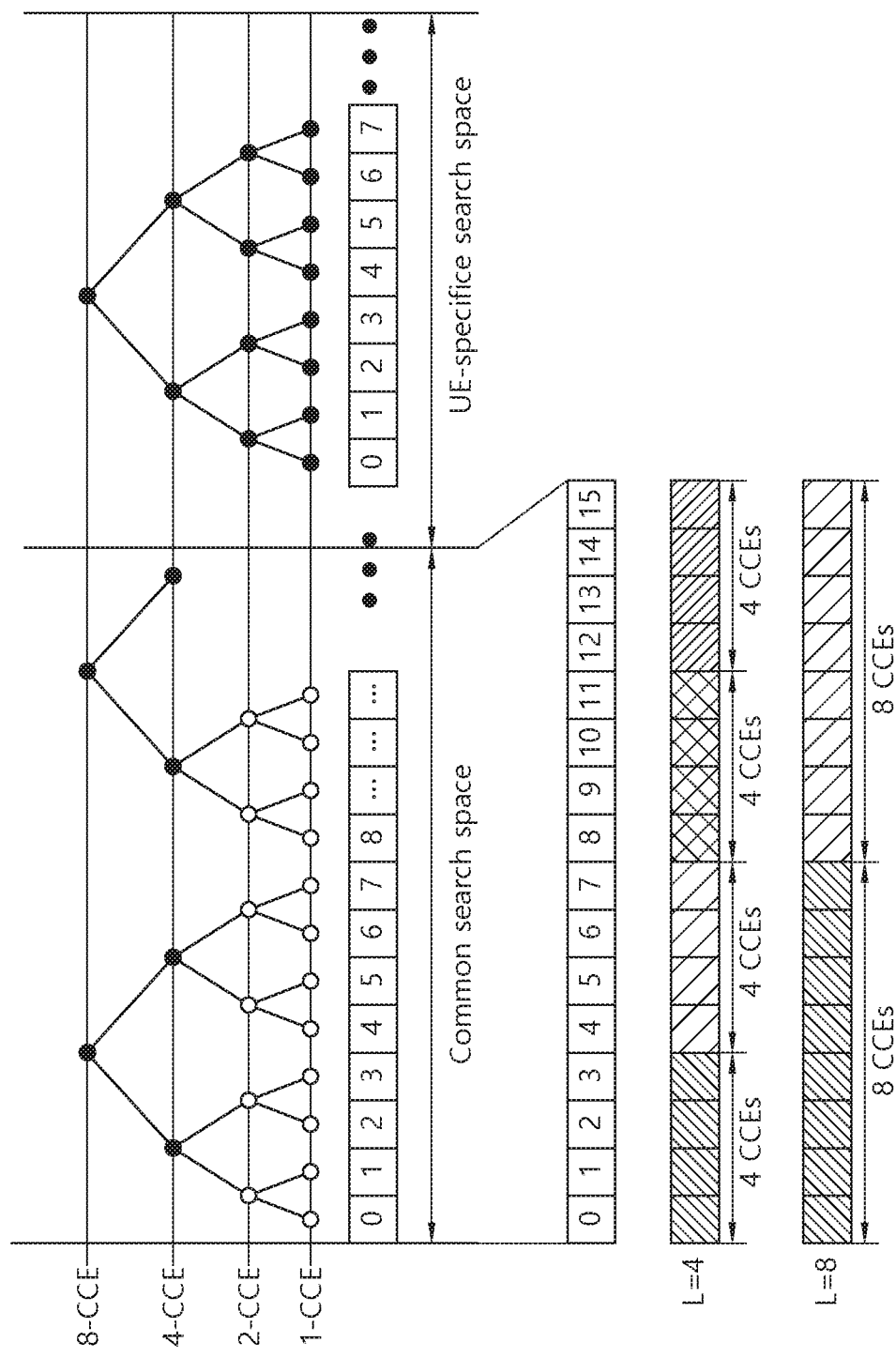
FIG. 7 illustrates an example of monitoring of a PDCCH.

FIG. 7 illustrates an example of monitoring of a PDCCH.

A UE cannot know about a specific position in a control region in which its PDCCH is transmitted and about a specific CCE aggregation or DCI format used for transmission. A plurality of PDCCHs can be transmitted in one subframe, and thus the UE monitors the plurality of PDCCHs in every subframe. Herein, monitoring is an operation of attempting PDCCH decoding by the UE according to a PDCCH format.

The 3GPP LTE uses a search space to reduce an overhead of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 2 below shows the number of PDCCH candidates monitored by a wireless device.

TABLE 2

| Type | Search space $S^{(L)}_k$ | | Number $M^{(L)}$ of PDCCH candidates |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1, 2, 3, 4}, a search space $S^{(L)}_k$ is defined as a set of PDCCH candidates. A CCE corresponding to a PDCCH candidate m of the search space $S^{(L)}_k$ is given by Equation 1 below.

$$L\{(Y_k+m') \bmod \lfloor N_{CCE,k}/L \rfloor\}+i \quad [\text{Equation 1}]$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is configured for the wireless device, m'=m+$M^{(L)}n_{cif}$. Herein, $n_{cif}$ is a value of the CIF. If the CIF is not configured for the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k=(A \cdot Y_{k-1}) \bmod D \quad [\text{Equation 2}]$$

Herein, $Y_{-1}=n_{RNTI}\neq 0$, A=39827, D=65537, k=floor($n_s/2$), and $n_s$ denotes a slot number in a radio frame.

When the UE monitors the PDCCH by using the C-RNTI, a search space and a DCI format used in monitoring are determined according to a transmission mode of the PDSCH.

Meanwhile, when the UE monitors the PDCCH by using the C-RNTI, a search space and a DCI format used in monitoring are determined according to a transmission mode (TM) of the PDSCH. Table 3 below shows an example of PDCCH monitoring for which the C-RNTI is configured.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |

TABLE 3-continued

| Transmission mode | DCI format | Search space | Transmission mode of PDSCH according to PDCCH |
|---|---|---|---|
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

FIG. 8 illustrates the architecture of a UL sub-frame in 3GPP LTE.

Referring to FIG. 8, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary.

A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 9:
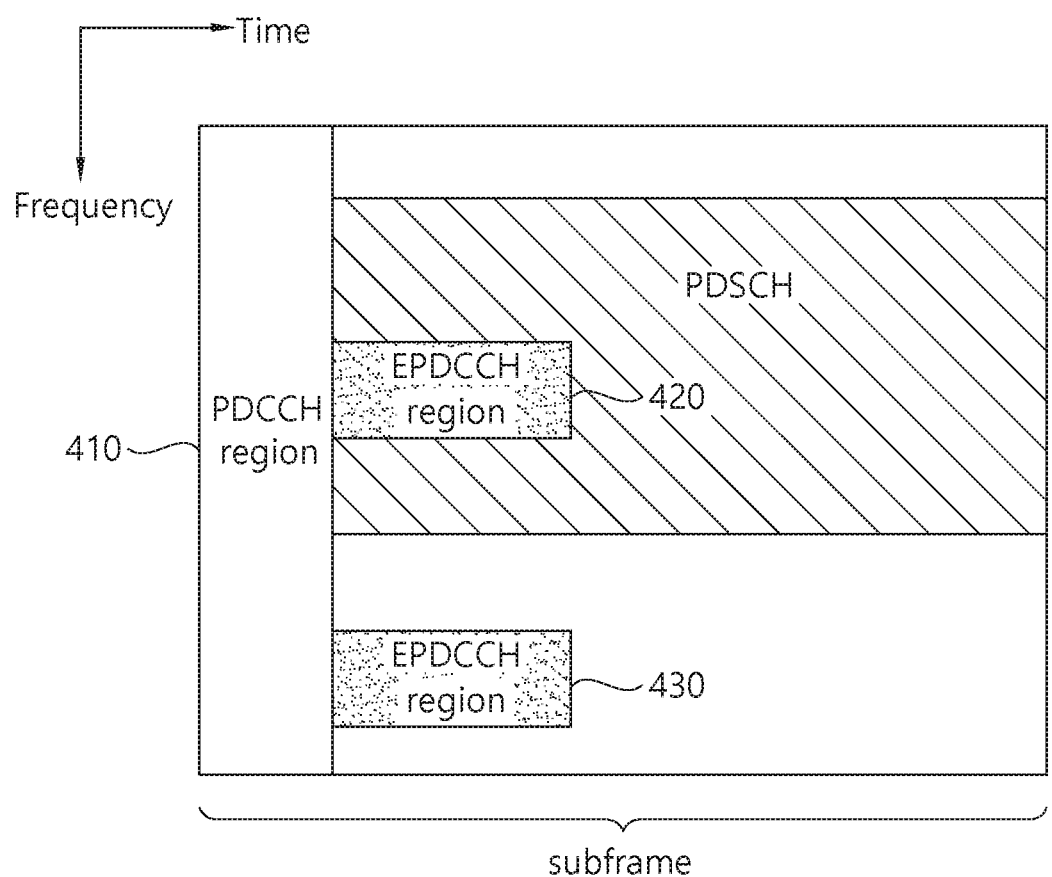
FIG. 9 illustrates a subframe having an EPDCCH.

FIG. 9 illustrates a subframe having an EPDCCH.

A subframe may include a zero or one PDCCH region 410 or zero or more EPDCCH regions 420 and 430.

The EPDCCH regions 420 and 430 are regions in which a wireless device monitors an EPDCCH. The PDCCH region 410 is located in up to four front OFDM symbols of a subframe, while the EPDCCH regions 420 and 430 may flexibly be scheduled in OFDM symbols after the PDCCH region 410.

One or more EPDCCH regions 420 and 430 may be designated for the wireless device, and the wireless devices may monitor an EPDCCH in the designated EPDCCH regions 420 and 430.

The number/location/size of the EPDCCH regions 420 and 430 and/or information on a subframe for monitoring an EPDCCH may be provided by a base station to a wireless device through an RRC message or the like.

In the PDCCH region 410, a PDCCH may be demodulated based on a CRS. In the EPDCCH regions 420 and 430, a demodulation (DM) RS may be defined, instead of a CRS, for demodulation of an EPDCCH. An associated DM RS may be transmitted in the corresponding EPDCCH regions 420 and 430.

An RS sequence $r_{ns}(m)$ for the associated DM RS is represented by Equation 3.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Here, m=0, 1, ..., $2N_{maxRB}-1$, $N_{maxRB}$ denotes the maximum number of RBs, ns denotes the number of a slot in a radio frame, and l denotes the number of an OFDM symbol in a slot.

A pseudo-random sequence c(i) is defined by the following gold sequence with a length of 31.

Here, m=0, 1, ..., $12N_{RB}-1$, and $N_{RB}$ denotes the maximum number of RBs. A pseudo-random sequence generator may be initialized as $c_{init}=(\text{floor}(ns/2)+1)(2N_{EPDCCH,ID}+1)2^{16}+n_{EPDCCH,SCID}$ in each starting subframe. ns is the number of a slot in a radio frame, $N_{EPDCCH,ID}$ is a value associated with an EPDCCH set, which is given through a higher-layer signal, and $N_{EPDCCH,SCID}$ is a specific value.

The EPDCCH regions 420 and 430 may be used for scheduling for different cells, respectively. For example, an EPDCCH in the EPDCCH region 420 may carry scheduling information for a primary cell, and an EPDCCH in the EPDCCH region 430 may carry scheduling information for a secondary cell.

When EPDCCHs are transmitted in the EPDCCH regions 420 and 430 through multiple antennas, the same precoding as for the EPDCCHs may be applied to DM RSs in the EPDCCH regions 420 and 430.

Comparing with a CCE used as a transmission resource unit for a PDCCH, a transmission resource unit for an EPDCCH is an enhanced control channel element (ECCE). An aggregation level may be defined as a resource unit for monitoring an EPDCCH. For example, defining one ECCE as a minimum resource for an EPDCCH, an aggregation level may be defined as L={1, 2, 4, 8, 16}.

Hereinafter, an EPDCCH search space may correspond to an EPDCCH region. In an EPDCCH search space, one or more EPDCCH candidates may be monitored by one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include four EREGs or eight EREGs according to a subframe type based on a TDD DL-UL configuration and a CP. For example, an ECCE may include four EREGs in a normal CP, while an ECCE may include eight EREGs in an extended CP.

A physical resource block (PRB) pair refers to two PRBs having the same RB number in one subframe. A PRB pair refers to a first PRB of a first slot and a second PRB of a second slot in the same frequency domain. In a normal CP, a PRB pair includes 12 subcarriers and 14 OFDM symbols and thus includes 168 REs.

Figure 10:
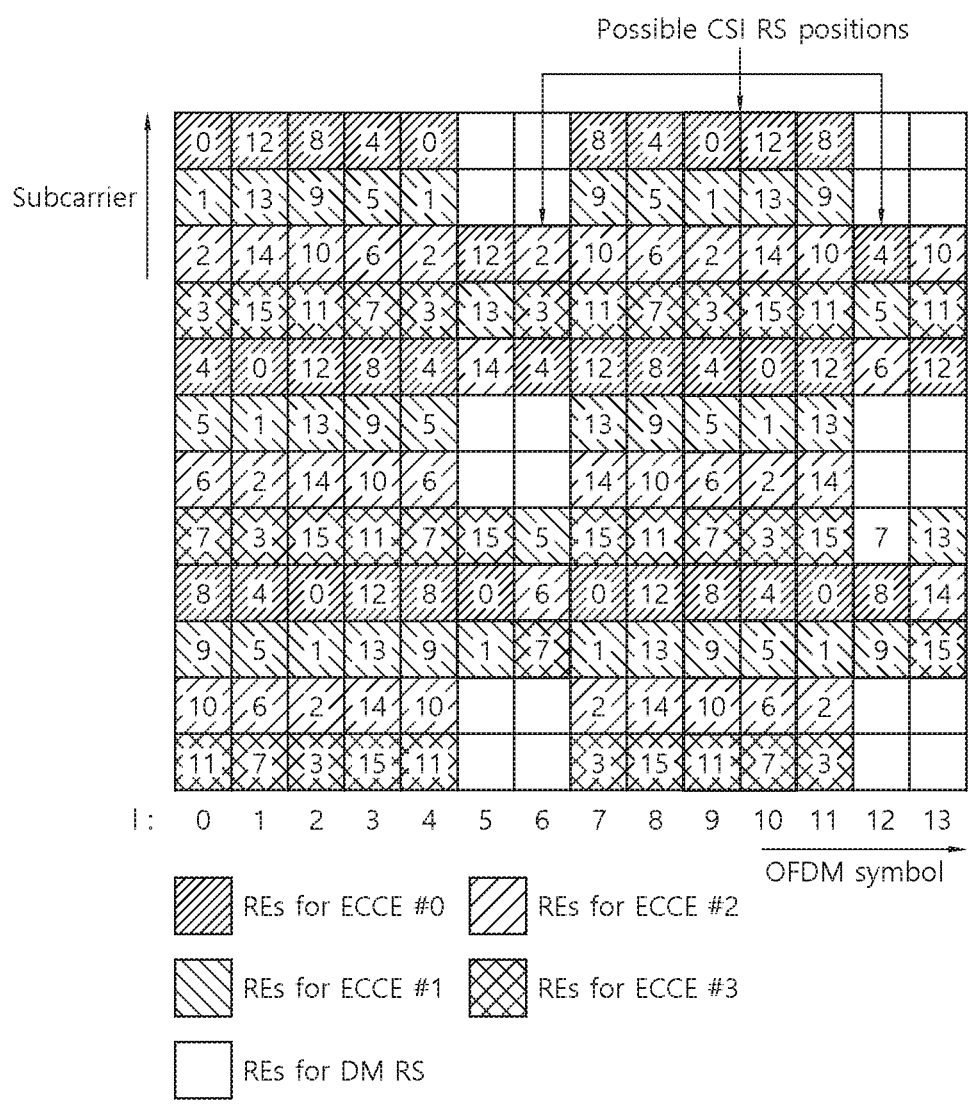
FIG. 10 illustrates an example of a PRB pair.

FIG. 10 illustrates an example of a PRB pair.

Although it is shown below that a subframe includes two slots and a PRB pair in one slot includes seven OFDM symbols and 12 subcarriers, these numbers of OFDM symbols and subcarriers are provided for illustrative purposes only.

In one subframe, a PRB pair includes 168 REs. 16 EREGs are formed from 144 Res, excluding 24 REs for a DM RS. Thus, one EREG may include nine REs. Here, a CSI-RS or CRS may be disposed in one PRB pair in addition the DM RM. In this case, the number of available REs may be reduced and the number of REs included in one EREG may be reduced. The number of REs included in an EREG may change, while the number of EREGs included in one PRB pair, 16, does not change.

Here, as illustrated in FIG. 10, REs may sequentially be assigned indexes, starting from a top subcarrier in a leftmost OFDM symbol (l=0) (or REs may sequentially be assigned indexes in an upward direction, starting from a bottom subcarrier in the leftmost OFDM symbol (l=0)). Suppose that 16 EREGs are assigned indexes from 0 to 15. Here, nine REs having RE index 0 are allocated to EREG 0. Likewise, nine REs having RE index k (k=0, ..., 15) are allocated to EREG k.

A plurality of EREGs is combined to define an EREG group. For example, an EREG group including four EREGs may be defined as follows: EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. An EREG group including eight EREGs may be defined as follows: EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE may include four EREGs, and an ECCE may include eight EREGs in an extended CP. An ECCE is defined by an ERGE group. For example, FIG. 6 shows that ECCE #0 includes EREG group #0, ECCE #1 includes EREG group #1, ECCE #2 includes EREG group #2, and ECCE #3 includes EREG group #3.

There are localized transmission and distributed transmission in ECCE-to-EREG mapping. In localized transmission, an EREG group forming one ECCE is selected from EREGs in one PRB pair. In distributed transmission, an EREG group forming one ECCE is selected from EREGs in different PRB pairs.

Hereinafter, MTC will be described.

Figure 11A:
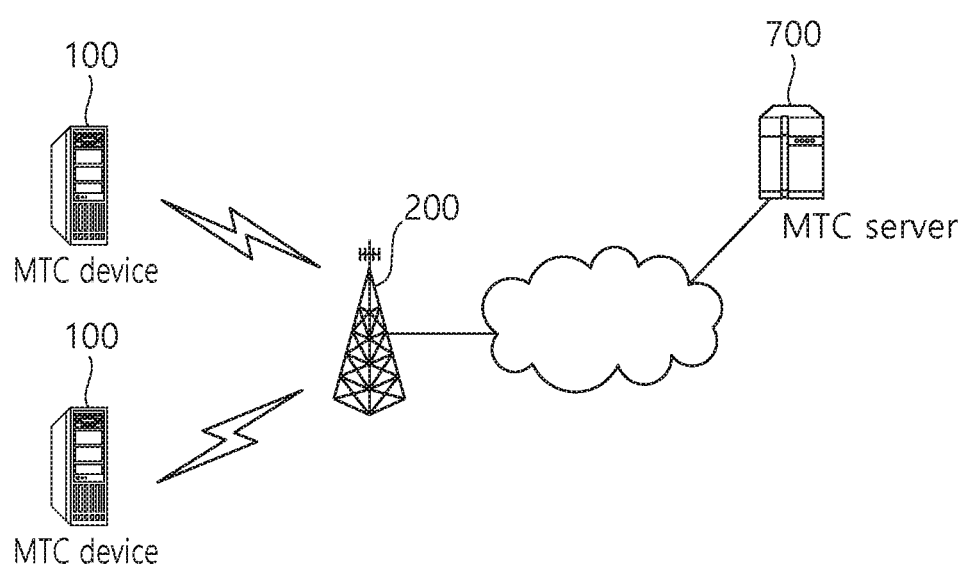
FIG. 11a illustrates an example of machine type communication (MTC).

FIG. 11a illustrates an example of machine type communication (MTC).

The MTC refers to an information exchange performed between MTC devices 100 via a BS 200 without human interactions or an information exchange performed between the MTC device 100 and an MTC server 700 via the BS.

The MTC server 700 is an entity for communicating with the MTC device 100. The MTC server 700 executes an MTC application, and provides an MTC-specific service to the MTC device.

The MTC device 100 is a wireless device for providing the MTC, and may be fixed or mobile.

A service provided using the MTC is differentiated from an existing communication service requiring human intervention, and its service range is various, such as tracking, metering, payment, medical field services, remote controlling, etc. More specifically, examples of the service provided using the MTC may include reading a meter, measuring a water level, utilizing a surveillance camera, inventory reporting of a vending machine, etc.

The MTC device is characterized in that a transmission data amount is small and uplink/downlink data transmission/ reception occurs sometimes. Therefore, it is effective to decrease a unit cost of the MTC device and to decrease battery consumption according to a low data transmission rate. The MTC device is characterized of having a small mobility, and thus is characterized in that a channel environment does almost not change.

Figure 11B:
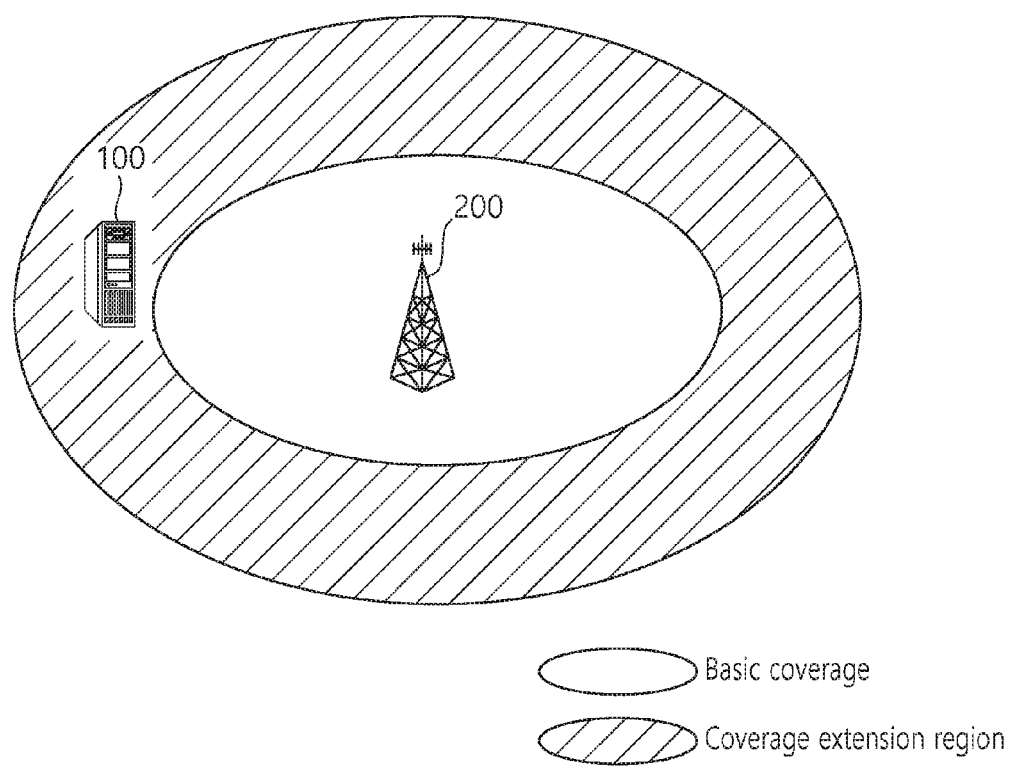
FIG. 11b illustrates an example of cell coverage extension for an MTC device.

FIG. 11b illustrates an example of cell coverage extension for an MTC device.

Recently, it is considered to extend cell coverage of a BS for an MTC device 100, and various schemes for extending the cell coverage are under discussion.

However, when the cell coverage is extended, if the BS transmits a PDSCH and a PDCCH including scheduling information for the PDSCH to the MTC device located in the coverage extension region as if it is transmitted to a normal UE, the MTC device has a difficulty in receiving this.

Embodiments of the Present Invention

Thus, embodiments of the present invention are provided to solve the foregoing problem.

According to one embodiment of the present invention, to solve the foregoing problem, when a BS transmits a PDSCH, a PDCCH, or an EPDCCH to an MTC device 100 located in a coverage extension region, the BS repeatedly transmits the PDSCH, the PDCCH, or the EPDCCH on a plurality of subframes (for example, a bundle of subframes).

Thus, the MTC device receives a bundle of (E)PDCCHs through a plurality of subframes and decodes the bundle of (E)PDCCHs, thereby decoding success rate.

That is, the MTC device may successfully decode a (E)PDCCH by using all or part of (E)PDCCHs in a bundle received through a plurality of subframes. That is, the MTC device may decode a (E)PDCCH bundle in which the same (E)PDCCH is repeated, thereby improving decoding success rate.

Likewise, the MTC device receives a bundle of PDSCHs through a plurality of subframes and decodes all or part of the PDSCHs in the bundle, thereby decoding success rate. Similarly, the MTC device located in the coverage extension region may transmit a bundle of (E)PUCCHs through a plurality of subframes. Also, the MTC device may transmit a bundle of PUSCHs through a plurality of subframes.

Figure 12A:
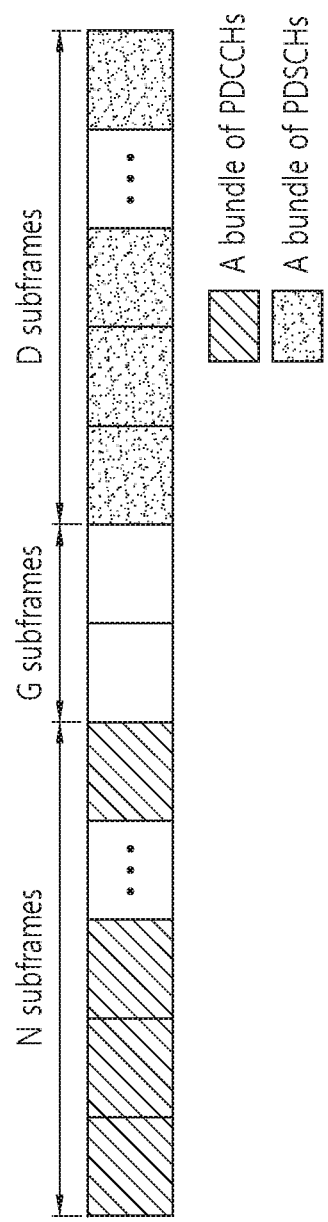
FIG. 12a and FIG. 12b illustrate an example of transmitting a (E)PDCCH bundle and a PDCCH bundle.

FIG. 12a and FIG. 12 illustrate an example of transmitting a (E)PDCCH bundle and a PDSCH bundle.

Referring to FIG. 12a, a BS may transmit a (E)PDCCH bundle in which the same (E)PDCCH is repeated on a plurality of subframes (for example, N subframes) to an MTC device located in a coverage extension region. Further, the BS may transmit a PDSCH bundle in which the same PDSCH is repeated on a plurality of subframes (for example, D subframes). Here, the PDSCH bundle may be transmitted after a predetermined gap, for example, a gap of G subframes, after the PDCCH bundle is completely transmitted.

For example, when transmission of the PDCCH bundle is finished on subframe N-1, the PDSCH bundle may be transmitted on D subframes, starting from subframe N+G. Here, N and D may always be set to the same value. Also, G and D may have the same value. G may be known in advance to a UE or be transmitted to the UE via system information, for example, an MIB or SIB.

D may be set or designated differently depending on a coverage extension degree. Alternatively, D may be designated differently depending on an aggregation level of each (E)PDCCH. For example, G may be set considering that a (E)PDCCH is repeated in different numbers by aggregation levels.

Meanwhile, the MTC device may know that transmission of the PDSCH bundle is started after G subframes after receiving the (E)PDCCH bundle.

Figure 12B:
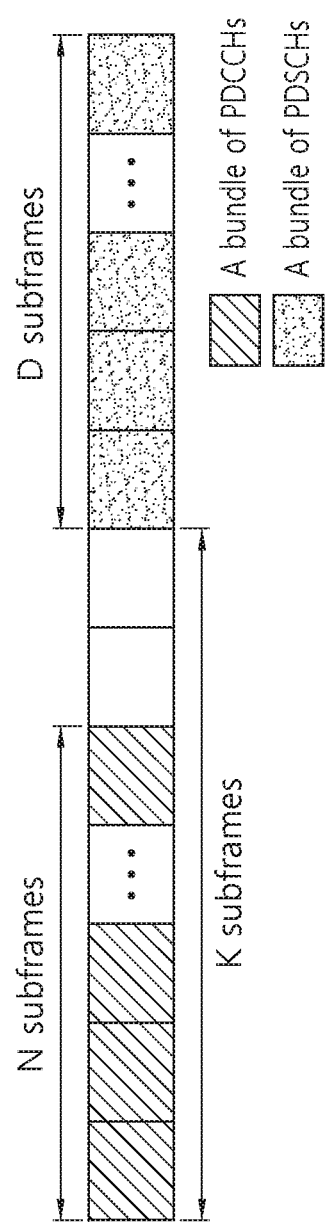

Referring to FIG. 12b, the BS may transmit, for the MTC device located in the coverage extension region, a (E)PDCCH bundle in N subframes and then transmit a PDSCH bundle in D subframes after a certain period of time.

Alternatively, the BS may transmit, for the MTC device located in the coverage extension region, a (E)PDCCH bundle in N subframes and then transmit a PDSCH bundle in D subframes after K subframes from a subframe in which transmission of the PDCCH bundle is started.

That is, a difference between a location of a subframe in which transmission of the (E)PDCCH bundle is started and a location of a subframe in which transmission of the PDSCH bundle is started is defined as K subframes (for example, K=100 or 200).

In this case, the MTC device needs to know in which subframe transmission of the (E)PDCCH bundle is started.

For example, defining that K=index of PDSCH bundle transmission start subframe−index of (E)PDCCH bundle transmission start subframe, the MTC device may need to know a timing at which transmission of the PDCCH bundle is started in order to successfully know a timing at which transmission of the PDSCH bundle is started.

In this case, the MTC device may know a location of a subframe at which transmission of the PDSCH bundle is started even though not being aware of the number of subframes for transmitting the (E)PDCCH bundle.

It may be assumed that K is always fixed. Alternatively, K may be known to the MTC device or be transmitted via an MIB or SIB. K may be set differently depending on a coverage extension degree. K may be set differently depending on an aggregation level of each (E)PDCCH. For example, K may be set considering that a (E)PDCCH is repeated in different numbers by aggregation levels.

As described above, a subframe location for starting transmission of the (E)PDCCH bundle is not random unlike in a conventional art, and transmission of the (E)PDCCH bundle may be started in a predetermined subframe. A subframe location at which transmission of the (E)PDCCH bundle is started may be defined as a fixed value. The fixed value may be notified to the MTC device through system information, for example, an MIB or SIB. For example, assuming that transmission of the (E)PDCCH bundle is started only in SFN % N=0 (for example, N=20), N may be notified to the MTC device through an MIB. Also, assuming that transmission of the (E)PDCCH bundle is started only in an offset (SFN % N=offset), N may be notified to the MTC device through an MIB. For example, transmission of the (E)PDCCH bundle for the MTC device located in the coverage extension region may be started only in a subframe or SFN corresponding to a multiple of 100 (subframe 0, 100, 200, 300, . . . ).

Here, the MTC device may attempt to receive the (E)PDCCH through N subframes starting from a subframe or SFN corresponding to a multiple of 100.

The subframe location at which transmission of the PDCCH bundle is started may change depending on an MTC device. That is, the subframe location at which transmission of the (E)PDCCH bundle is started may be determined to be user-specific.

In this case, information on the subframe location at which transmission of the PDCCH bundle is started may be notified to the MTC device through a higher-layer signal, such as an RRC signal.

Meanwhile, when the coverage extension degree (that is, how far the coverage is extended) for the MTC device is determined, the number of (E)PDCCH repetition times the for the MTC device may change on an aggregation level of a PDCCH, which will be described with reference to FIGS. 13 and 14.

Figure 13:
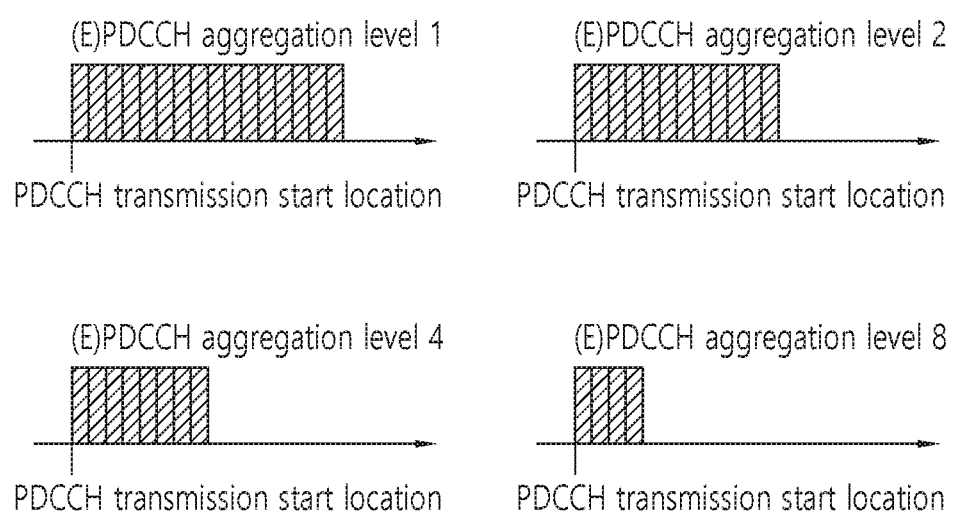
FIG. 13 illustrates an example of a change in the number of (E)PDCCH repetition times according to an aggregation level of a (E)PDCCH.

FIG. 13 illustrates an example of a change in the number of (E)PDCCH repetition times according to an aggregation level of a (E)PDCCH.

As illustrated in FIG. 13, when (E)PDCCH aggregation levels 1, 2, 4, and 8 are used for an MTC device located in a coverage extension region, a (E)PDCCH using a lower aggregation level may be transmitted repeatedly a greater number of times.

A period and/or offset of a (E)PDCCH transmission start subframe (or subframe location/pattern) in which transmission of a (E)PDCCH bundle is started may change according to a (E)PDCCH repetition level (or the number of (E)PDCCH repetition times or the number of subframes for transmitting the (E)PDCCH bundle). For example, when a higher (E)PDCCH repetition level (or a greater number of subframes for transmitting the (E)PDCCH bundle) is used, the period of the (E)PDCCH transmission start subframe may be set longer.

Figure 14:
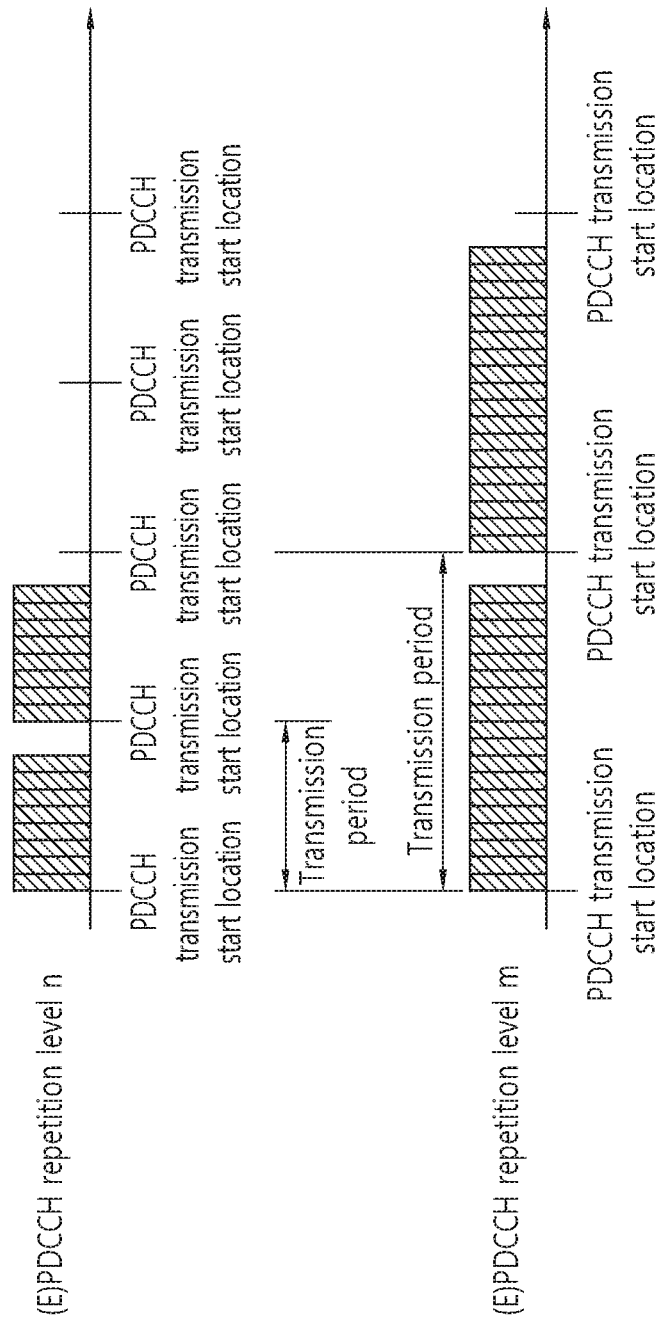
FIG. 14 illustrates an example of a change in a transmission start location according to the number of (E)PDCCH repetition times.

FIG. 14 illustrates an example of a change in a transmission start location according to the number of (E)PDCCH repetition times.

For example, when there are L (for example, 3) (E)PDCCH repetition levels (for example, (E)PDCCH repetition level 1, (E)PDCCH repetition level 2, . . . (E)PDCCH repetition level L) and m>n, (E)PDCCH repetition level m may need a greater number of repetitions (or a greater number of subframes) than (E)PDCCH repetition level n. Here, to construct transmission subframe regions for (E)PDCCHs having different repetition levels to maximally overlap, as illustrated in FIG. 14, a period between transmission start subframes for a (E)PDCCH bundle transmitted at (E)PDCCH repetition level m may be N times (for example, N=2) a period between transmission subframes for a (E)PDCCH bundle transmitted in repetition level n which is one lower than repetition level m. That is, a period between start subframes for a (E)PDCCH bundle transmitted at a specific (E)PDCCH repetition level may be designated to be a multiple of a period between subframes for a (E)PDCCH bundle transmitted at a repetition level one lower than the specific (E)PDCCH repetition level. Using this method enables efficient (E)PDCCH resource distribution between (E)PDCCH bundles transmitted at different repetition levels.

Meanwhile, it may be important to apply a higher aggregation level to an EPDCCH in order to improve performance of the MTC device located in the coverage extension region in receiving and decoding an EPDCCH bundle.

Hereinafter, a scheme for applying a higher aggregation level to an EPDCCH for an MTC device located in a coverage extension region will be described with reference to Tables 1, 2, 3, and 4.

A. Scheme for Applying Higher Aggregation Level to EPDCCH

As described above, it is necessary to apply a higher aggregation level to an EPDCCH so that the MTC device located in the coverage extension region properly receives the EPDCCH.

In particular, it is necessary to apply aggregation level 32 to for the MTC device located in the coverage extension region.

Specifically, when the MTC device receives an EPDCCH bundle in which the same EPDCCH is repeated on N subframes, the MTC device may need to determine a search space with respect to each of the N subframes.

N may be a repetition level.

Here, the search space may be determined based on the number of EPDCCH candidates.

That is, in aggregation level LE {1, 2, 4, 8, 16, 32}, a search space $ES^{(L)}_k$ is defined as a set of EPDCCH candidates. An ECCE corresponding to EPDCCH candidate m in the search space $ES^{(L)}_k$ is given as follows.

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i \quad \text{[Equation 4]}$$

Here, L is an aggregation level; i=0, ..., L−1; m=0, ..., $M_p^{(L)}$−1; $M_p^{(L)}$ is the number of EPDCCH candidates in aggregation level L in EPDCCH PRB set p; and $N_{ECCE,p,k}$ is the number of ECCEs in EPDCCH p of subframe k. b is the value of a carrier indicator field (CIF, if the CIF is configured) or 0 (if the CIF is not configured). $Y_{p,k}$ is a variable acquired based on the C-RNTI of a wireless device.

Further, the number of EPDCCH candidates to be monitored by the MTC device may be determined based on an aggregation level, the number of PRBs (that is, the number of PRB pairs) in an EPDCCH PRB set, an EPDCCH transmission mode (a localized EPDCCH transmission mode or a distributed EPDCCH transmission mode), and any one of case 1, case 2 and case 3. Here, case 1, case 2, and case 3 are determined based on a used DCI format or on whether a used CP is a normal CP or extended CP.

Case 1 to case 3 may apply as follows.

Case 1 applies as below.

1. For normal subframes and a normal downlink cyclic prefix (CP) when DCI formats 2/2A/2B/2C/2D are monitored and $N_{RB}^{DL}$≥25.

2. For special subframes with special subframe configurations 3, 4, and 8 and a normal downlink CP when DCI formats 2/2A/2B/2C/2D are monitored.

3. For normal subframes and a normal downlink CP when DCI formats 1A/1B/1D/1/2/2A/2B/2C/2D/0/4 are monitored and $n_{EPDCCH}$<104.

4. For special subframes with special subframe configurations 3, 4, and 8, a normal downlink CP when DCI formats 1A/1B/1D/1/2A/2/2B/2C/2D/0/4 are monitored, and $n_{EPDCCH}$<104.

Case 2 applies as below.

1. For normal subframes and an extended downlink CP when DCI formats 1A/1B/1D/1/2A/2/2B/2C/2D/0/4 are monitored.

2. For special subframes with special subframe configurations 1, 2, 6, 7, and 9 and a normal downlink CP when DCI formats 1A/1B/1D/1/2A/2/2B/2C/2D/0/4 are monitored.

3. For special subframes with special subframe configurations 1, 2, 3, 5, and 6 and an extended downlink CP when DCI formats 1A/1B/1D/1/2A/2/2B/2C/2D/0/4 are monitored.

Case 3 applies in other cases.

Table 5 illustrates the number of EPDCCH candidates $M_p^{(L)}$ for case 1 and case 2 in one distributed EPDCCH PRB set p.

Here, $N_{RB}^{Xp}$ denotes the number of PRB pairs in EPDCCH PRB set p.

TABLE 5

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{Xp}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

Table 6 illustrates the number of EPDCCH candidates $M_p^{(L)}$ for case 3 in one distributed EPDCCH PRB set p.

TABLE 6

| | Number of EPDCCH candidates $M_p^{(L)}$ for Case 3 | | | | |
|---|---|---|---|---|---|
| $N_{RB}^{Xp}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

Table 7 illustrates the numbers of EPDCCH candidates $M_{p1}^{(L)}$ and $M_{p1}^{(L)}$ for case 1 and case 2 in two distributed EPDCCH PRB sets $p_1$ and $p_2$.

Here, $N_{RB}^{Xp1}$ and $N_{RB}^{Xp2}$ denote the numbers of PRB pairs in EPDCCH PRB sets $p_1$ and $p_2$, respectively.

TABLE 7

| | | Number of EPDCCH candidates $[M_{p1}^{(L)}, M_{p2}^{(L)}]$ for Case 1 | | | | | Number of EPDCCH candidates $[M_{p1}^{(L)}, M_{p2}^{(L)}]$ for Case 2 | | | | |
|---|---|---|---|---|---|---|---|---|---|---|---|
| $N_{RB}^{Xp1}$ | $N_{RB}^{Xp2}$ | L = 2 | L = 4 | L = 8 | L = 16 | L = 32 | L = 1 | L = 2 | L = 4 | L = 8 | L = 16 |
| 2 | 2 | 4, 4 | 2, 2 | 1, 1 | 0, 0 | 0, 0 | 4, 4 | 2, 2 | 1, 1 | 0, 0 | 0, 0 |
| 4 | 4 | 3, 3 | 3, 3 | 1, 1 | 1, 1 | 0, 0 | 3, 3 | 3, 3 | 1, 1 | 1, 1 | 0, 0 |
| 8 | 8 | 3, 3 | 2, 2 | 1, 1 | 1, 1 | 1, 1 | 3, 3 | 2, 2 | 1, 1 | 1, 1 | 1, 1 |
| 4 | 2 | 5, 3 | 3, 2 | 1, 1 | 1, 0 | 0, 0 | 5, 3 | 3, 2 | 1, 1 | 1, 0 | 0, 0 |
| 8 | 2 | 4, 2 | 4, 2 | 1, 1 | 1, 0 | 1, 0 | 4, 2 | 4, 2 | 1, 1 | 1, 0 | 1, 0 |
| 8 | 4 | 3, 3 | 2, 2 | 2, 1 | 1, 1 | 1, 0 | 3, 3 | 2, 2 | 2, 1 | 1, 1 | 1, 0 |

Here, $n_{EPDCCH}$ denotes the number of downlink REs in a PRB pair configured for possible EPDCCH transmission of an EPDCCH set.

Table 8 illustrates the numbers of EPDCCH candidates $M_{p1}^{(L)}$ and $M_{p1}^{(L)}$ for case 3 in two distributed EPDCCH PRB sets $p_1$ and $p_2$.

TABLE 8

| | | Number of EPDCCH candidates $[M_{p1}^{(L)}, M_{p2}^{(L)}]$ for Case 3 | | | | |
|---|---|---|---|---|---|---|
| $N_{RB}^{Xp1}$ | $N_{RB}^{Xp2}$ | L = 1 | L = 2 | L = 4 | L = 8 | L = 16 |
| 2 | 2 | 2, 2 | 3, 3 | 2, 2 | 1, 1 | 0, 0 |
| 4 | 4 | 2, 2 | 2, 2 | 2, 2 | 1, 1 | 1, 1 |
| 8 | 8 | 2, 2 | 2, 2 | 2, 2 | 1, 1 | 1, 1 |
| 4 | 2 | 3, 1 | 3, 2 | 3, 1 | 1, 1 | 1, 0 |
| 8 | 2 | 3, 1 | 4, 1 | 3, 1 | 1, 1 | 1, 0 |
| 8 | 4 | 2, 2 | 2, 2 | 2, 2 | 1, 1 | 1, 1 |

Therefore, aggregation level 32 for a current EPDCCH may applied only to a distributed EPDCCH PRB set in an environment of case 1.

In one embodiment of the present invention, a UE receiving an EPDCCH may be an MTC device located in a coverage extension region.

Thus, the embodiment of the present invention suggests that the UE receiving the EPDCCH includes the MTC device located in the coverage extension region in case 1 in order to support an EPDCCH having an aggregation level 32 for the MTC device needing coverage enhancement. Here, a table for distributed EPDCCHs may be used to support an aggregation level of 32 for localized EPDCCHs. To this end, when the UE receiving the EPDCCH is the MTC device located in the coverage extension region, case 1 is always applied for the MTC device to use an aggregation level of 32. Alternatively, when the UE receiving the EPDCCH is the MTC device located in the coverage extension region, case 1 is always employed for a normal subframe (using a normal CP, that is, a general subframe, not a special subframe) so that aggregation level 32 is used.

for MTC UEs with coverage enhancement mode
for MTC UEs requiring enhanced coverage of EPDCCH
for MTC UEs with EPDCCH repetition level L
for MTC UEs with EPDCCH repetition level higher than L Here, L is a preset value or a value given via higher-layer signaling.

Meanwhile, the number of EPDCCH candidates by aggregation levels for the current EPDCCH may be different in case 1, case 2, and case 3 as illustrated in Table 5, Table 6, Table 7, and Table 8.

Although Table 5, Table 6, Table 7, and Table 8 illustrate the numbers of EPDCCH candidates in distributed EPDCCH PRB sets, different numbers of EPDCCH candidates may be set in each case for localized EPDCCH PRB sets.

Here, a different case may be applied depending on $n_{EPDCCH}$ in each subframe, and the number of EPDCCH candidates by aggregation levels may also change.

When a different case is applied depending on $n_{EPDCCH}$ in each subframe, a configuration of a search space in the subframe may also change.

Ultimately, when an EPDCCH is repeatedly transmitted through multiple subframes, there may be a subframe where a different number of EPDCCH candidates are applied due to a change in $n_{EPDCCH}$ for example, a special subframe in TDD) among subframes for transmitting the EPDCCH bundle.

In this case, as the number of EPDCCH candidates by aggregation levels and a search space configuration are changed, an EPDCCH, transmitted via previous subframes, may not be transmitted or a different EPDCCH candidate may be transmitted.

Thus, a scheme for receiving an EPDCCH in a subframe where a different number of EPDCCH candidates are applied will be described below.

B. Scheme for Receiving EPDCCH in Subframe where Different Number of EPDCCH Candidates are Applied As described above, a different case may be applied according to $n_{EPDCCH}$ in each subframe, and the number of EPDCCH candidates by aggregation levels may also change.

Figure 15:
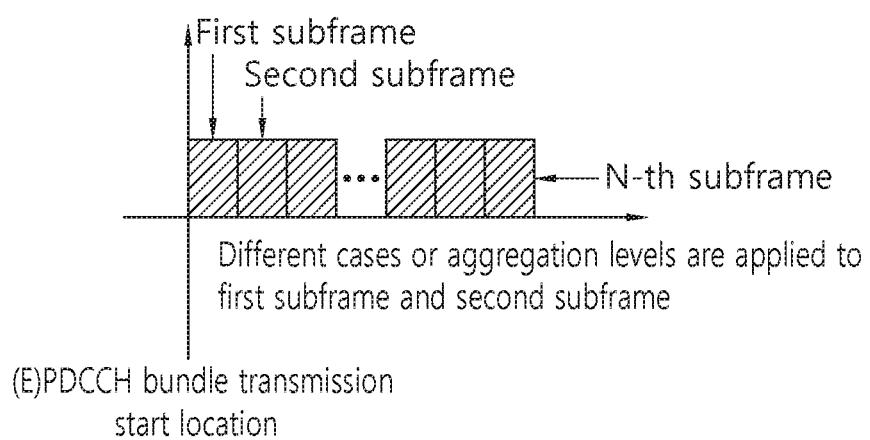
FIG. 15 illustrates an example in which different cases are applied to subframes.

FIG. 15 illustrates an example in which different cases are applied to subframes.

As illustrated in FIG. 15, different cases or aggregation levels may be applied to a first subframe SF_1 and a second subframe SF_2 while transmitting an EPDCCH bundle.

For example, case 1 may be applied in the first subframe SF_1, while case 2 may be applied in the second subframe SF_2.

To solve this problem, according to an embodiment of the present invention, when a UE receives an EPDCCH bundle in which the same EPDCCH is transmitted on N subframes, the UE determines a first search space for receiving the EPDCCH on a first subframe among the N subframes. Subsequently, the UE may determine a second search space for receiving the EPDCCH on a second subframe among the N subframes. Here, the first and second search spaces are determined based on the number of EPDCCH candidates, and the number of EPDCCH candidates are determined based on an aggregation level, the number of PRBs (that is, the number of PRB pairs) in an EPDCCH PRB set, an EPDCCH transmission mode (localized mode or distributed mode), and any one of a first case (case 1), a second case (case 2) and a third case (case 3). When a case used to determine the first search space and a case used to determine the second search space are the same, the UE may decode the EPDCCH in the second search space of the second subframe.

The case for the first search space and the case for the second search space may be the first case, which may support aggregation level 32.

The receiving method may further include skipping decoding of the EPDCCH in the second search space of the second subframe when the case for the first search space and the case for the second search space are different.

The number of EPDCCH candidates may be determined on an aggregation level.

Here, the first case may support aggregation levels of 2, 4, 8, 16, and 32, the second case may support aggregation levels of 2, 4, 8, and 16, the third case may support aggregation levels of 2, 4, 8, and 16, and different numbers of EPDCCH candidates may be configured by aggregation levels in the second case and the third case.

The decoding of the EPDCCH in the second search space may be performed assuming that an aggregation level for the first search space and an aggregation level for the second search space are the same.

For example, an aggregation level for the first search space and an aggregation level for the second search space may be the aggregation levels for the first case.

The UE may assume that a number of EPDCCH candidates in the second search space is a number of EPDCCH candidates in an aggregation level two times an aggregation level for the second search space.

The UE may be a machine-type communication (MTC) device located in a coverage extension region.

Therefore, the first case may include a case where the UE receiving the EPDCCH is the MTC device located in the coverage extension region.

To summarize, the receiving method according to the embodiment of the present invention provides a first scheme, a second scheme, and a third scheme illustrated below when different cases are applied to subframes.

First Scheme

According to the first scheme, when different cases are applied to subframes, the MTC device may assume that the same case is always applied in subframes for transmitting one EPDCCH bundle regardless of $n_{EPDCCH}$ in each subframe.

Here, the case applied by the MTC device in the subframes for transmitting one EPDCCH bundle may be the same as a case determined based on $n_{EPDCCH}$ in a first subframe for transmitting the EPDCCH bundle.

Alternatively, the case applied in the subframes for transmitting one EPDCCH bundle may always be fixed as the first case.

Alternatively, the case applied in the subframes for transmitting one EPDCCH bundle may change according to an EPDCCH repetition level.

Alternatively, the MTC device may assume that the number of EPDCCH candidates by aggregation levels is always the same in the subframes for transmitting one EPDCCH bundle regardless of $n_{EPDCCH}$ in each subframe.

Here, the number of EPDCCH candidates by aggregation levels applied to the subframes for transmitting one EPDCCH bundle may be the same as the number of EPDCCH candidates by aggregation levels in the first subframe for transmitting the EPDCCH bundle.

Alternatively, the number of EPDCCH candidates by aggregation levels applied to the subframes for transmitting one EPDCCH bundle may always be fixed to be the number of EPDCCH candidates by aggregation levels for case 1.

Alternatively, the number of EPDCCH candidates by aggregation levels applied to the subframes for transmitting one EPDCCH bundle may change according to an EPDCCH repetition level of the MTC device.

Second Scheme

According to the second scheme, when different cases are applied to subframes, that is, when there is a subframe where a different number of EPDCCH candidates are applied due to a change in $n_{EPDCCH}$ during transmission of an EPDCCH, the MTC device may assume that no EPDCCH is transmitted in the subframe.

That is, the MTC device according to the second scheme may assume that no EPDCCH is transmitted in a subframe where a different case from that applied to the first subframe for transmitting the EPDCCH bundle is applied.

Third Scheme

According to the third scheme, when different cases are applied to subframes, that is, when there is a subframe where a different number of EPDCCH candidates are applied due to a change in $n_{EPDCCH}$ during transmission of an EPDCCH, the MTC device may assume that the EPDCCH is transmitted via an EPDCCH candidate having a double aggregation level in the subframe.

That is, the MTC device according to the third scheme may attempt to receive an EPDCCH using an aggregation level which is twice an aggregation level in the first subframe for transmitting the EPDCCH bundle.

Additional Embodiments of the Present Invention

Hereinafter, additional embodiments of the present invention will be described with reference to FIGS. 16 to 21.

A. Resource Allocation Scheme for EPDCCH Bundle Transmission for Coverage Extension As described above, an EPDCCH may be transmitted repeatedly through a plurality of subframes to extend the coverage of an MTC device.

Here, a scheme may be needed for efficiently configuring RE/ECCE/PRB resources for transmitting the EPDCCH in each subframe for transmitting one EPDCCH bundle.

First, another embodiment of the present invention suggests a scheme for transmitting an EPDCCH through the same EPDCCH PRB set in each subframe when one EPDCCH bundle is transmitted through a plurality of subframes.

Figure 16:
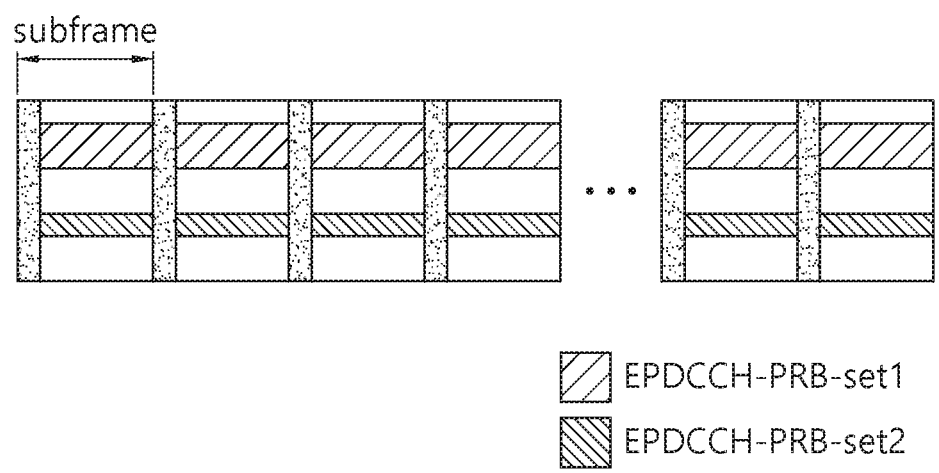
FIG. 16 illustrates an example of a resource allocation scheme for an EPDCCH according to another embodiment of the present invention.

FIG. 16 illustrates an example of a resource allocation scheme for an EPDCCH according to another embodiment of the present invention.

As illustrated in FIG. 16, when there are EPDCCH PRB set 1 and EPDCCH PRB set 2, an EPDCCH repeatedly transmitted through a plurality of subframes may be transmitted via the same EPDCCH PRB set in all of the subframes for transmitting the EPDCCH.

That is, the EPDCCH bundle may be transmitted via EPDCCH PRB set 1 only or EPDCCH PRB set 2 only in the subframes for transmitting the EPDCCH bundle.

Here, the other embodiment of the present invention suggests that a PRB region designated for one EPDCCH PRB set may vary by subframes.

In particular, the PRB region designated for one EPDCCH PRB set may change with a certain pattern in each subframe.

Here, a pattern for changing the PRB region of the EPDCCH PRB set according to a subframe may be determined or set to be cell-specific or UE-specific.

When the pattern is cell-specific, the pattern may be a fixed particular pattern, a pattern extracted from a cell ID, or a pattern set based on a higher-layer signal (for example, RRC signal).

Further, when the pattern is UE-specific, the pattern may be a pattern extracted from a UE ID (for example, C-RNTI) or a pattern set based on a higher-layer signal (for example, RRC signal).

Meanwhile, the EPDCCH may be transmitted in a localized transmission mode or distributed transmission.

Here, when one EPDCCH bundle is transmitted through a plurality of subframes, the EPDCCH may be transmitted in the subframes using only one of the localized transmission mode and distributed transmission mode.

That is, the EPDCCH bundle may be transmitted using the same transmission mode in the subframes for the EPDCCH bundle.

EPDCCH transmission schemes by transmission modes are described as follows.

EPDCCH Transmission Scheme According to Localized Transmission Mode

When the EPDCCH bundle is transmitted using the localized transmission mode, the other embodiment of the present invention suggests applying the same precoding in subframes for transmitting the EPDCCH bundle.

Here, a UE or an MTC device may assume that the same precoding as that applied to a first subframe for transmitting the EPDCCH bundle is applied to the subframes for transmitting the EPDCCH.

This is for using a channel estimation value obtained from a plurality of subframes for data decoding.

Further, the other embodiment of the present invention suggests the following scheme in order to use the channel estimation value obtained from the subframes for data decoding and to reduce EPDCCH reception complexity of the UE or MTC device.

First, the other embodiment of the present invention suggests that a PRB location in one EPDCCH PRB set or a PRB location for transmitting the EPDCCH is the same in a subframe bundle for transmitting the EPDCCH.

Also, the other embodiment of the present invention suggests that locations and indexes of ECCE resources for transmitting one EPDCCH are the same in the subframe bundle for transmitting the EPDCCH.

Further, the other embodiment of the present invention suggests that PRB locations in the ECCE resources for transmitting one EPDCCH are the same in the subframe bundle for transmitting the EPDCCH.

In addition, the other embodiment of the present invention suggests that the EPDCCH is transmitted using the same antenna port in the subframes for transmitting the EPDCCH in order to use the channel estimation value obtained from the plurality of subframes for data decoding and to reduce EPDCCH reception complexity of the UE or MTC device.

Specifically, a location of an antenna port used for EPDCCH transmission in the localized transmission mode may be determined based on the lowest index of an ECCE among ECCE resources for transmitting the EPDCCH.

Thus, the other embodiment of the present invention suggests that ECCE resources for transmitting the EPDCCH in the EPDCCH bundle have the same index in order to use the same antenna port in the subframes for transmitting the EPDCCH.

Further, the other embodiment of the present invention suggests that the same antenna port as that determined or applied in the first subframe for transmitting the EPDCCH bundle is used for the subframes for transmitting the EPDCCH bundle.

EPDCCH Transmission Scheme According to Distributed Transmission Mode

When the EPDCCH bundle is transmitted using the distributed transmission mode, each RE in one EREG is associated with one of two antenna ports in an alternating manner using antenna ports {107, 109} for a normal CP and antenna ports {107, 108} for an extended CP.

The other embodiment of the present invention suggests using a different antenna port for transmitting the EPDCCH in each subframe for transmitting the EPDCCH bundle for antenna port diversity.

For example, the EPDCCH may be transmitted using antenna ports 107 and 109 in even subframes among the subframes for transmitting the EPDCCH bundle, and using antenna ports 108 and 110 in odd subframes.

B. Scheme for Determining Location of Possible EPDCCH Transmission Start Subframe Meanwhile, a location of a subframe for starting transmission of a (E)PDCCH bundle may be designated for transmission of an (E)PDCCH through a plurality of subframes.

That is, the location of the subframe for starting transmission of the (E)PDCCH may not be random unlike in a conventional art, and transmission of the (E)PDCCH may be started only in a predetermined subframe.

Thus, still another embodiment of the present invention suggests determining a location of a possible EPDCCH transmission start subframe as follows.

First Determination Scheme

The first determination scheme suggests that a location of a possible EPDCCH transmission start subframe is the same as a location of a possible PDCCH transmission start subframe.

Thus, when a UE or MTC device recognizes the location of the possible PDCCH transmission start subframe, the UE or MTC device assumes that transmission of the EPDCCH bundle can be started in the subframe.

Second Determination Scheme

The second determination scheme suggests that a location of a possible EPDCCH transmission start subframe for transmission of an EPDCCH bundle is separate from a location of a possible PDCCH transmission start subframe.

The location of the possible EPDCCH bundle transmission start subframe may be defined as a fixed value. The fixed value may be transmitted through an MIB.

For example, assuming that transmission of the EPDCCH bundle is started only in "SFN % N=0" (for example, N=20), N may be transmitted through an MIB.

Further, assuming that transmission of the EPDCCH bundle is started only in "SFN % N=offset," the offset may also be transmitted through an MIB. For example, transmission of the EPDCCH for an MTC device having a coverage extension issue may be started only in a subframe or SFN corresponding to a multiple of 100 (subframes 0, 100, 200, 300, . . . ). Here, the MTC device may attempt to receive the EPDCCH through N subframes starting from a subframe or SFN corresponding to a multiple of 100.

The location of the possible EPDCCH bundle transmission start subframe may be determined to be user-specific. In this case, information on the location of the possible EPDCCH bundle transmission start subframe may be configured through a higher-layer signal, such as an RRC signal.

Meanwhile, there are EPDCCH monitoring subframes which are subframes for the UE or MTC device to receive the EPDCCH. Thus, the UE or MTC device attempts to receive the EPDCCH only in the EPDCCH monitoring subframes.

Further, the UE or MTC device does not attempt to receive a PDCCH in the EPDCCH monitoring subframes. Here, the possible (E)PDCCH transmission start subframe may be or may not be an EPDDH monitoring subframe.

In this case, yet another embodiment of the present invention may determine locations of possible transmission start subframes for a PDCCH and an EPDCCH as follows.

Figure 17A:
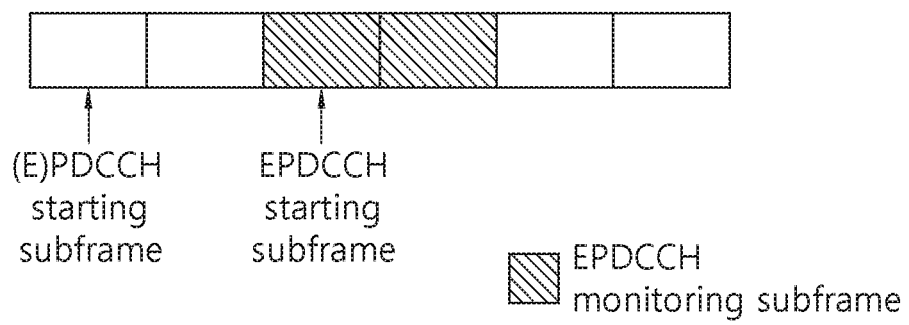
FIG. 17a and FIG. 17b illustrate an example of a scheme for determining locations of possible PDCCH and EPDCCH transmission start subframes according to yet another embodiment of the present invention.
Figure 17B:
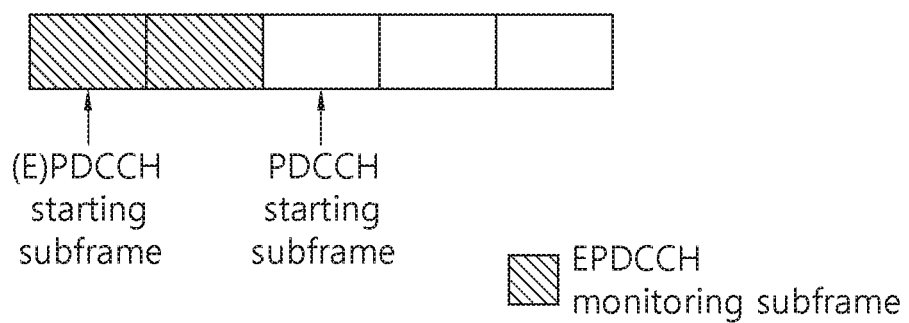

FIG. 17a and FIG. 17b illustrate an example of a scheme for determining locations of possible PDCCH and EPDCCH transmission start subframes according to yet another embodiment of the present invention.

First, when a possible transmission start subframe for a specific EPDCCH is an EPDCCH monitoring subframe, the UE or MTC device may assume that transmission of an EPDCCH bundle may be started in the subframe.

Further, when a possible transmission start subframe for a specific PDCCH is not an EPDCCH monitoring subframe, the UE or MTC device may assume that transmission of a PDCCH bundle may be started in the subframe.

In addition, when a possible transmission start subframe for a specific PDCCH is an EPDCCH monitoring subframe, the UE or MTC device may assume that transmission of a PDCCH bundle is not started in the subframe.

Alternatively, the UE or MTC device may assume that transmission of a PDCCH bundle is started in a nearest non-EPDCCH monitoring subframe after the subframe.

For example, as illustrated in FIG. 17a, when a subframe designated as a subframe for starting PDCCH transmission (PDCCH starting subframe) is an EPDCCH subframe, the UE or MTC device may assume that a nearest non-EPDCCH monitoring subframe after the subframe is a PDCCH starting subframe.

Alternatively, the UE or MTC device may assume that transmission of the PDCCH bundle may be started in a nearest non-EPDCCH monitoring subframe among L subframes (for example, subframe n+1, . . . , subframe n+L) after a subframe (for example, subframe n) designated as a PDCCH starting frame.

In addition, when a possible transmission start subframe for a specific EPDCCH is not an EPDCCH monitoring subframe, the UE or MTC device may assume that transmission of an EPDCCH bundle is not started in the subframe.

Alternatively, the UE or MTC device may assume that transmission of the EPDCCH bundle may be started in a nearest EPCCH monitoring subframe after the subframe.

For example, as illustrated in FIG. 17b, when a subframe designated as a subframe for starting EPDCCH transmission (EPDCCH starting subframe) is not an EPDCCH monitoring subframe, the UE or MTC device may assume that a nearest EPDCCH monitoring subframe after the subframe is an EPDCCH starting subframe.

Alternatively, the UE or MTC device may assume that transmission of the EPDCCH bundle may be started in a nearest EPDCCH monitoring subframe among L subframes (for example, subframe n+1, . . . , subframe n+L) after a subframe (for example, subframe n) designated as an EPDCCH starting frame.

C. Scheme for Configuring EPDCCH Repetition Level

Meanwhile, the MTC device may use one of a plurality of (E)PDCCH repetition levels (for example, three levels) according to a coverage extension level required by the MTC device.

In still another embodiment of the present invention, a (E)PDCCH coverage extension level or a (E)PDCCH repetition level determined according to a coverage extension degree required by the MTC device is defined as a (E)PDCCH repetition level.

Here, the MTC device may have only one (E)PDCCH repetition level at a time, and the (E)PDCCH repetition level may be a value which is invariable or variable semi-statically or dynamically while the MTC device stays in a cell.

One embodiment of the present invention suggests that an EPDCCH repetition level is the same as a PDCCH repetition level.

That is, when the MTC device configures, recognizes or determines a PDCCH repetition level, the MTC device may apply the same PDCCH repetition level to an EPDCCH.

In this case, the number of EPDCCH repetition levels and the value of each repetition level may be the same as the number of PDCCH repetition levels and the value of each repetition level, respectively.

Particularly, even though a PDCCH and an EPDCCH have the same repetition level, the number of practical PDCCH repetitions (the number of subframes used for repetitions) and the number of practical EPDCCH repetitions (the number of subframes used for repetitions) may be different.

Meanwhile, one embodiment of the present invention suggests that an EPDCCH repetition level is configured for transmission of an EPDCCH bundle, separately from a PDCCH repetition level.

In this case, the number of EPDCCH repetition levels and the value of each repetition level may be the same as or different from the number of PDCCH repetition levels and the value of each repetition level, respectively.

Particularly, even though a PDCCH and an EPDCCH have the same repetition level, the number of practical PDCCH repetitions (the number of subframes used for repetitions) and the number of practical EPDCCH repetitions (the number of subframes used for repetitions) may be different.

D. Scheme for Monitoring PDCCH on Cell-Specific Search Space (CSS)—Scheme for receiving cell-specific PDCCH Meanwhile, a PDCCH may not be transmitted on a USS as a UE-specific search space in an EPDCCH monitoring subframe but may be transmitted on a CSS as a cell-specific search space.

A CSS may be present in a PDCCH. Thus, for the MTC device requiring extension of particular coverage, a PDCCH in an EPDCCH monitoring subframe may be transmitted only on the CSS.

Thus, yet another embodiment of the present invention suggests that when a collision between a CCE/RE resource in a CSS of a PDCCH and a CCE/RE resource in a USS of the PDCCH occurs in a particular EPDCCH monitoring subframe, the MTC device assumes that the PDCCH is transmitted on the CSS.

That is, when a collision between a CCE/RE resource in a CSS of a PDCCH and a CCE/RE resource in a USS of the PDCCH occurs in a particular EPDCCH monitoring subframe, the MTC device may perform PDCCH bundling and decoding, assuming that the PDCCH is transmitted on the CSS in the subframe.

In the following description, a PDCCH subframe transmitted in a CSS is defined as a cell-specific PDCCH transmission subframe or CSS subframe.

Still another embodiment of the present invention suggests that a CSS subframe is configured. A CSS subframe may refer to the following subframes.

A CSS subframe may denote a subframe for transmitting a cell-specific PDCCH. Thus, no cell-specific PDCCH may be transmitted in other subframes.

A CSS subframe may denote a subframe where a CSS is present. Thus, no CSS is present in other subframes.

A CSS subframe may denote a subframe for transmitting a cell-specific PDCCH only. Thus, in this subframe, only a cell-specific PDCCH may be transmitted and no UE-specific PDCCH and/or UE-specific EPDCCH is transmitted. Further, no cell-specific PDCCH is transmitted in other subframes.

A CSS subframe may denote a subframe where only a CSS is present. Thus, in this subframe, only a CSS is present and no USS is present. Further, no CSS is present in other subframes.

Meanwhile, yet another embodiment of the present invention suggests a scheme for configuring a CSS subframe as follows.

A CSS subframe may be defined in advance or be configured to be cell-specific through an MIB, SIB, or an RRC signal from a BS (eNodeB).

Alternatively, a CSS subframe may be defined in advance or be configured to be UE-specific through an RRC signal or PDCCH (DCI) from the BS (eNodeB).

A CSS subframe may be fixed, be semi-statically changed, or be dynamically configured.

Hereinafter, a scheme for configuring a CSS in an EPDCCH monitoring subframe and a non-EPDCCH monitoring subframe according to still another embodiment of the present invention will be described.

For a given serving cell, a UE or MTC device may use the value of parameter epdcch-StartSymbol-r11 signaled from a higher layer as $I_{EPDCCHStart}$ or obtain $I_{EPDCCHStart}$ from a CFI value in a subframe of the given serving cell. Here, $I_{EPDCCHStar\ t}$ may refer to a starting OFDM symbol for an EPDCCH.

In this case, when the MTC device receives a PDCCH transmitted on a CSS through multiple subframes, the number of OFDM symbols for transmitting the PDCCH in an EPDCCH monitoring subframe and the number of OFDM symbols for transmitting the PDCCH in a non-EPDCCH monitoring subframe may be assigned differently.

Figure 18:
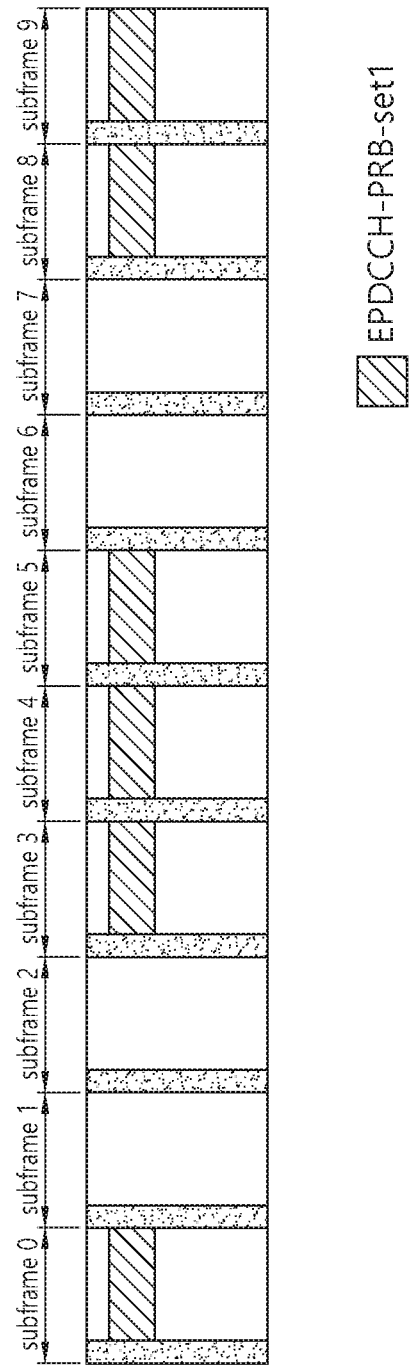
FIG. 18 illustrates a situation in which the number of OFDM symbols for transmitting a PDCCH in an EPDCCH monitoring subframe and the number of OFDM symbols for transmitting the PDCCH in a non-EPDCCH monitoring subframe are assigned differently.

FIG. 18 illustrates a situation in which the number of OFDM symbols for transmitting a PDCCH in an EPDCCH monitoring subframe and the number of OFDM symbols for transmitting the PDCCH in a non-EPDCCH monitoring subframe are assigned differently.

Referring to FIG. 18, the number of OFDM symbols for transmitting a PDCCH in EPDCCH monitoring subframes (subframes #0, #4, #5, #6, #8, and #9 in FIG. 18) may be 1, while the number of OFDM symbols for transmitting the PDCCH in non-EPDCCH monitoring subframes (subframes #1, #2, #6, and #7 in FIG. 18) may be 3.

Meanwhile, a CSS for an MTC device located in a coverage extension region may be assigned to be separate or different from a CSS for a legacy MTC device.

For example, the CSS for the legacy MTC device is configured with M CCE regions, starting from CCE index 0, while the CSS for the MTC device located in the coverage extension region may be configured with N CCE regions, starting from CCE index M+1, with an offset being in the CCE regions of the CSS for the legacy MTC device.

However, this method may be effective when there are a sufficient number of CCEs for transmitting a PDCCH. Therefore, it may be determined whether to apply this method according to the number of CCEs for transmitting a PDCCH.

Further, as described above, the number of OFDM symbols for transmitting a PDCCH may change in an EPDCCH monitoring subframe and a non-EPDCCH monitoring subframe, in which case the number of CCEs for transmitting the PDCCH may also change in the EPDCCH monitoring subframe and the non-EPDCCH monitoring subframe.

Accordingly, the embodiment of the present invention suggests configuring or applying a method of assigning the CSS for the MTC device located in the coverage extension region to be separate or different from the CSS for the legacy MTC device in an EPDCCH monitoring subframe and a non-EPDCCH monitoring subframe.

Here, it may be determined according to the number of OFDM symbols for transmitting a PDCCH in each subframe and/or $I_{EPDCCHStar\ t}$ whether to apply the method of assigning the CSS for the MTC device located in the coverage extension region to be separate or different from the CSS for the legacy MTC device in an EPDCCH monitoring subframe and a non-EPDCCH monitoring subframe.

Further, the embodiment of the present invention suggests configuring or applying a method in which the CSS for the MTC device located in the coverage extension region is assigned to be separate or different from the CSS for the legacy MTC device in a non-EPDCCH monitoring subframe and the CSS for the MTC device located in the coverage extension region is assigned to be the same as the CSS for the legacy MTC device in an EPDCCH monitoring subframe.

Also, the embodiment of the present invention suggests that the number of subframes for transmitting a PDCCH in CSS subframes is always equivalent to the specified number of OFDM symbols (for example, three OFDM symbols) in order to secure a sufficient number of CCEs in the subframes for transmitting a CSS.

In addition, the embodiment of the present invention suggests applying, as the number of subframes for transmitting a PDCCH in CSS subframes, a higher value of the number of OFDM symbols for transmitting the PDCCH in an EPDCCH monitoring subframe and the number of OFDM symbols for transmitting the PDCCH in a non-EPDCCH monitoring subframe.

Moreover, it is suggested that a higher value of the value of epdcch-StartSymbol-r11 signaled from the higher layer and the number of OFDM symbols for transmitting the PDCCH in the non-EPDCCH monitoring subframe is applied as $I_{EPDCCHStar\ t}$ in a CSS subframe.

E. Scheme for Monitoring PDCCH on USS—Scheme for Receiving UE-Specific PDCCH

Meanwhile, in order to receive DCI on a USS, the MTC device may receive DCI on a USS of a PDCCH in a non-EPDCCH monitoring subframe or on an EPDCCH in an EPDCCH monitoring subframe.

Thus, to receive one piece of DCI, the MTC device located in the coverage extension region may need to receive a PDCCH or EPDCCH using USSs of multiple subframes.

The legacy MTC device may not need to attempt to receive a PDCCH and an EPDCCH simultaneously transmitted on a USS since reception of one piece of DCI is finished in one subframe.

However, the MTC device located in the coverage extension region may need to attempt to receive a PDCCH transmitted on a USS, simultaneously with attempting to receive an EPDCCH since one piece of DCI is received through multiple subframes.

Figure 19:
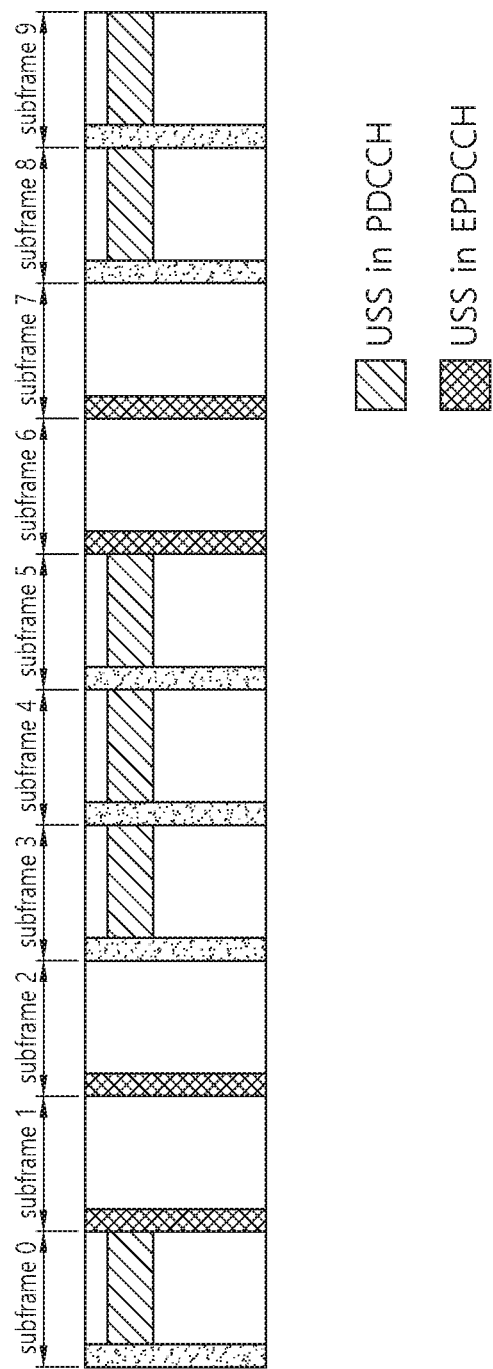
FIG. 19 illustrates an example in which an MTC device located in a coverage extension region attempts to receive a PDCCH transmitted on a USS, simultaneously with attempting to receive an EPDCCH.

FIG. 19 illustrates an example in which an MTC device located in a coverage extension region attempts to receive a PDCCH transmitted on a USS, simultaneously with attempting to receive an EPDCCH.

Referring to FIG. 19, when the MTC device located in the coverage extension region attempts to receive DCI through each of a PDCCH and an EPDCCH from subframe #0, the MTC device may attempt to decode EPDCCHs via combining in EPDCCH monitoring subframes #0, #3, #4, #5, #8, and #9, while attempting to decode PDCCHs in a USS via combining in subframes #1, #2, #6, and #7.

Yet another embodiment of the present invention suggests that when a DL grant (UL grant) is transmitted on a USS of a PDCCH, no additional DL grant (UL grant) is transmitted via the USS of the PDCCH or an EPDCCH until the DL grant is completely transmitted.

Likewise, the embodiment suggests that when a DL grant is transmitted via an EPDCCH, no additional another DL grant (UL) grant is transmitted via a USS of a PDCCH or an EPDCCH until the DL grant (UL grant) is completely transmitted.

Meanwhile, when the MTC device receives one piece of DCI, a PDCCH or EPDCCH may be used. That is, the MTC device in the coverage extension region may receive a PDCCH or an EPDCCH on USSs of a plurality of subframes in order to receive one piece of DCI.

Here, as illustrated in FIG. 19, when an EPDCCH monitoring subframe is configured with part of subframes in an entire radio frame, the number of subframes for the MTC device to receive a PDCCH on a USS may be reduced as compared with that in the absence of an EPDCCH monitoring subframe and the number of subframes for the MTC device to receive an EPDCCH may be reduced as compared with that in a case where an EPDCCH monitoring subframe is configured with all subframes.

Still another embodiment of the present invention suggests using both a PDCCH and an EPDCCH to transmit one piece of DCI. Particularly, it is suggested to use both a PDCCH and an EPDCCH on a USS to transmit one pieces of UE-specific DCI.

For example, to transmit one piece of DCI through ten subframes starting from subframe #0, as illustrated in FIG. 19, when there are EPDCCH monitoring subframes (subframes #0, #4, #5, #6, #8, and #9 in FIG. 19) and non-EPDCCH monitoring subframes (subframes #1, #2, #6, and #7 in FIG. 19), an EPDCCH in the EPDCCH monitoring subframes and a PDCCH in the non-EPDCCH monitoring subframes may be used together.

That is, if one piece of DCI is repeatedly transmitted through subframes #0 to #9 in FIG. 19, the DCI may be transmitted through the EPDCCH in subframes #0, #4, #5, #6, #8, and #9 and be transmitted through the PDCCH in subframes #1, #2, #6, and #7.

Here, a PDCCH candidate index and an EPDCCH candidate index, which are used to transmit the same DCI, may be the same.

For example, if DCI to transmit to the MTC device is transmitted through PDCCH candidate index m in a non-EPDCCH monitoring subframe, the DCI may be transmitted through EPDCCH candidate index m in an EPDCCH monitoring subframe.

Further, a CCE region of a PDCCH candidate and an ECCE region of an EPDCCH candidate, which are used to transmit the same DCI, may have a special relationship.

For example, CCE indexes forming a PDCCH candidate used to transmit DCI in a non-EPDCCH monitoring subframe may be the same as ECCE indexes forming an EPDCCH candidate used to transmit the DCI in an EPDCCH monitoring subframe.

F. Scheme for Transmitting EPDCCH Through Multiple Aggregation Levels

Hereinafter, a scheme for transmitting an EPDCCH through multiple aggregation levels according to yet another embodiment of the present invention will be described in detail.

The embodiment of the present invention suggests a scheme for transmitting one EPDCCH using EPDCCH candidate regions for multiple aggregation levels.

Although the following description will be made with reference to an EPDCCH, the principle or details of the invention may also be applied to a PDCCH.

The embodiment suggests that a particular MTC device is assigned a monitoring subframe by aggregation levels first in order to receive an EPDCCH.

The MTC device may be assigned a monitoring subframe by each aggregation level through an SIB or RRC signal from a BS (eNodeB).

The monitoring subframe by aggregation levels may be based on a 10-msec radio frame, and one subframe or a plurality of subframes may be configured for each aggregation level.

Figure 20:
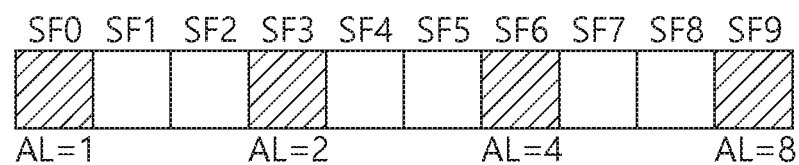
FIG. 20 illustrates an example of a monitoring subframe for an aggregation level according to still another embodiment of the present invention.

FIG. 20 illustrates an example of a monitoring subframe for an aggregation level according to still another embodiment of the present invention.

Referring to FIG. 20, a monitoring subframe for aggregation level 1 (AL=1) may be subframe 0 (SF0).

Likewise, monitoring subframes for aggregation levels 2, 4, and 8 (AL=2, AL=4, and AL=8) may be subframes 3, 6, and 9, respectively.

Monitoring subframes by aggregation levels may be configured to be UE-specific and be reconfigured later.

In yet another embodiment of the present invention, all monitoring subframes by aggregation levels are defined as an EPDCCH bundle monitoring subframe.

That is, in FIG. 20, subframes 0, 3, 6, and 9 as all monitoring subframes by aggregation levels AL may be an EPDCCH bundle monitoring subframe for the MTC device.

In a monitoring subframe for aggregation level L (AL=L), an EPDCCH may be transmitted to the MTC device on an EPDCCH search space for aggregation level L.

Thus, the EPDCCH may be transmitted to the MTC device through one of EPDCCH candidates for aggregation level L in the subframe.

Here, one EPDCCH may be transmitted through all EPDCCH bundle monitoring subframes configured for the MTC device.

When an EPDCCH is transmitted to a particular MTC device, the EPDCCH may be transmitted through each EPDCCH bundle monitoring subframe (for example, subframes 0, 3, 6, and 9 in FIG. 20), in which the EPDCCH may be transmitted through a search space suitable for an aggregation level for each monitoring subframe in each EPDCCH bundle monitoring subframe (for example, subframe 0 for aggregation level 1, subframe 3 for aggregation level 2, subframe 6 for aggregation level 4, and subframe 9 for aggregation level 8 in FIG. 20).

For example, assuming that there are two EPDCCH candidates for each aggregation level, in a case of four monitoring subframes, the MTC device performs blind decoding $2^4=16$ times in total in order to receive one EPDCCH in a 10-msec radio frame, since there are two EPDCCH candidates in each subframe.

However, assuming that an EPDCCH is transmitted through the same EPDCCH candidate index m in each subframe, the MTC device may receive the EPDCCH by performing blind decoding twice only, since there are two EPDCCH candidates in each subframe.

Figure 21:
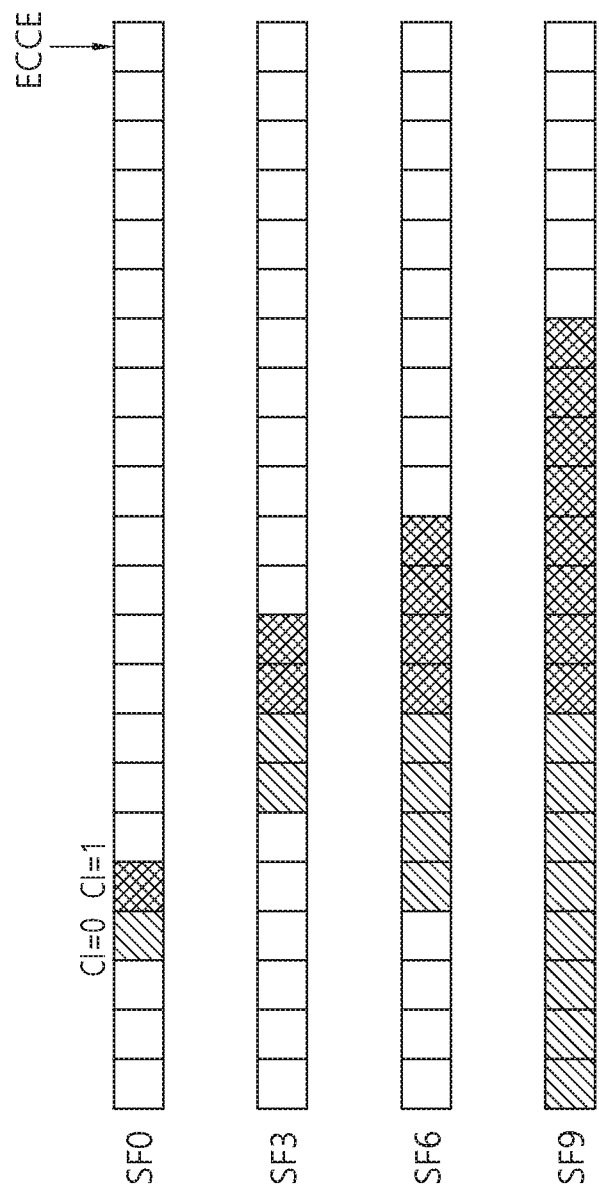
FIG. 21 illustrates an example in which an EPDCCH is transmitted through the same EPDCCH candidate index in each subframe according to still another embodiment of the present invention.

FIG. 21 illustrates an example in which an EPDCCH is transmitted through the same EPDCCH candidate index in each subframe according to still another embodiment of the present invention.

Referring to FIG. 20 and FIG. 21, when an EPDCCH bundle monitoring subframe is determined (for example, as shown in FIG. 20, subframe 0 for aggregation level 1, subframe 3 for aggregation level 2, subframe 6 for aggregation level 4, and subframe 9 for aggregation level 8) and there are two EPDCCH candidates by each aggregation level, an EPDCCH may be transmitted through all EPDCCH bundle monitoring subframes, which may be transmitted through one EPDCCH candidate in each subframe. In particular, the EPDCCH may be transmitted through the same candidate index (CI) in each subframe.

When the EPDCCH is transmitted in the aforementioned transmission mode, an EPDCCH transmission period, the number of transmission times, and the number of transmission subframes may change according to an EPDCCH repetition level of the MTC device located in the coverage extension region.

Here, when the aforementioned transmission mode is used, an EPDCCH transmission unit may be a 10-msec radio frame, and the number of radio frames during which the EPDCCH is transmitted may change according to the EPDCCH repetition level.

The MTC device may combine and decode EPDCCHs transmitted through multiple radio frames or multiple subframes according to the EPDCCH repetition level.

The description which has been made so far may be applied to not only an MTC device requiring coverage extension but an MTC device not requiring coverage extension (or MTC device whose coverage is 0 dB-improved).

Figure 22:
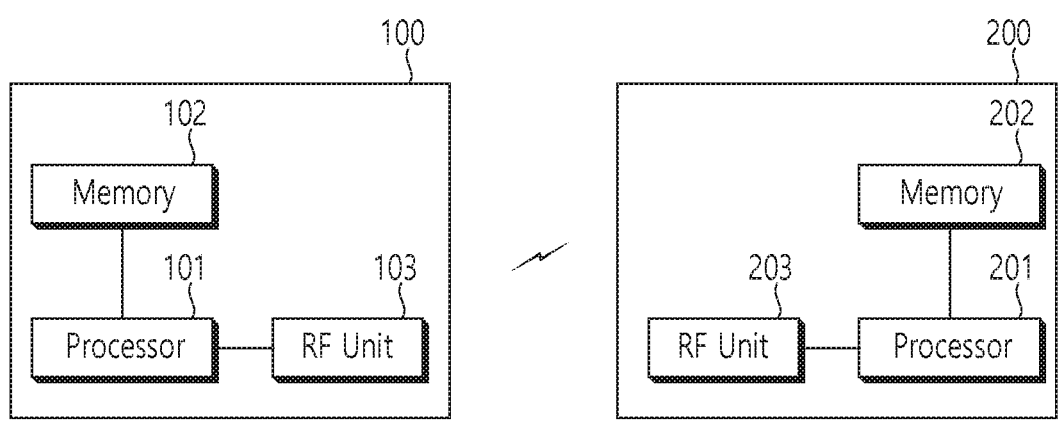
FIG. 22 is a block diagram illustrating a wireless communication system according to an embodiment of the present invention.

The aforementioned embodiments of the present invention can be implemented through various means. For example, the embodiments of the present invention can be implemented in hardware, firmware, software, combination of them, etc. Details thereof will be described with reference to the drawing FIG. 22 is a block diagram of a wireless communication system according to a disclosure of the present specification.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

An MTC device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

A UE according to one embodiment of the present invention, which receives an EPDCCH, includes a radio frequency (RF) unit; and a processor to determine a first search space for receiving an EPDCCH on a first subframe among N subframes when an EPDCCH bundle in which the same EPDCCH is repeated on the N subframes is received through the RF unit, to decode the first subframe in the first search space, to determine a second search space for receiving the EPDCCH on a second subframe among the N subframes, and to decode the second subframe in the second search space, wherein the first and second search spaces are determined based on a number of EPDCCH candidates, the EPDCCH candidates are determined according to any one of a first case (case 1), a second case (case 2) and a third case (case 3), and the processor decodes the second subframe when cases for the first search space and the second search space are the same.

The case for the first search space and the case for the second search space may be the first case.

The processor may assume that no EPDCCH is transmitted on the second subframe when the case for the first search space and the case for the second search space are different.

The UE may be an MTC device located in a coverage extension region.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving an enhanced physical downlink control channel (EPDCCH) by a user equipment (UE), the method comprising:
    determining a first search space for receiving an EPDCCH on a first subframe among N subframes when an EPDCCH bundle in which the same EPDCCH is repeated on the N subframes is to be received;
    determining a second search space for receiving the EPDCCH on a second subframe among the N subframes, each of the first and second search spaces being determined based on a number of EPDCCH candidates, and the number of EPDCCH candidates being determined according to any one of a first case (case 1), a second case (case 2) and a third case (case 3) classified on the basis of a DCI format and whether a cyclic prefix (CP) being used is a normal CP or an extended CP; and
    decoding the EPDCCH in the second search space of the second subframe when cases for determining the first search space and the second search space are the same.

2. The method of claim 1, wherein the case for the first search space and the case for the second search space are the first case, which supports aggregation level 32.

3. The method of claim 1, further comprising:
    skipping the decoding of the EPDCCH in the second search space of the second subframe when the case for the first search space and the case for the second search space are different.

4. The method of claim 1, wherein the number of EPDCCH candidates is determined on an aggregation level.

5. The method of claim 4, wherein
    the first case supports aggregation levels of 2, 4, 8, 16, and 32,
    the second case supports aggregation levels of 2, 4, 8, and 16,
    the third case supports aggregation levels of 2, 4, 8, and 16, and
    different numbers of EPDCCH candidates are configured by aggregation levels in the second case and the third case.

6. The method of claim 5, wherein the decoding of the EPDCCH in the second search space is performed assuming that an aggregation level for the first search space and an aggregation level for the second search space are the same.

7. The method of claim 5, when an aggregation level for the first search space and an aggregation level for the second search space are the aggregation levels for the first case.

8. The method of claim 5, wherein the UE assumes that a number of EPDCCH candidates in the second search space is a number of EPDCCH candidates in an aggregation level two times an aggregation level for the second search space.

9. The method of claim 1, wherein the UE is a machine-type communication (MTC) device located in a coverage extension region.

10. A user equipment (UE) for receiving an enhanced physical downlink control channel (EPDCCH), the UE comprising:
- a radio frequency (RF) unit; and
- a processor to determine a first search space for receiving an EPDCCH on a first subframe among N subframes when an EPDCCH bundle in which the same EPDCCH is repeated on the N subframes is to be received through the RF unit, to decode the first subframe in the first search space, to determine a second search space for receiving the EPDCCH on a second subframe among the N subframes, and to decode the second subframe in the second search space,
- wherein the first and second search spaces are determined based on a number of EPDCCH candidates,
- the EPDCCH candidates are determined according to any one of a first case (case 1), a second case (case 2) and a third case (case 3), and
- the processor decodes the second subframe when cases for the first search space and the second search space are the same.

11. The UE of claim 10, wherein the case for the first search space and the case for the second search space are the first case.

12. The UE of claim 10, wherein the processor assumes that no EPDCCH is transmitted on the second subframe when the case for the first search space and the case for the second search space are different.

13. The UE of claim 10, wherein the UE is a machine-type communication (MTC) device located in a coverage extension region.

* * * * *